(12) United States Patent
Ghosh et al.

(10) Patent No.: US 8,736,629 B1
(45) Date of Patent: May 27, 2014

(54) SYSTEM AND METHOD FOR AN EFFICIENT DISPLAY DATA TRANSFER ALGORITHM OVER NETWORK

(71) Applicant: nComputing Inc., Santa Clara, CA (US)

(72) Inventors: Subir Ghosh, San Jose, CA (US); Anita Chowdhry, Saratoga, CA (US); Sergey Kipnis, Pleinfeld (DE)

(73) Assignee: nComputing Inc., Santa Clara, CA (US)

( * ) Notice: Subject to any disclaimer, the term of this patent is extended or adjusted under 35 U.S.C. 154(b) by 0 days.

(21) Appl. No.: 13/774,819

(22) Filed: Feb. 22, 2013

Related U.S. Application Data

(63) Continuation of application No. 13/684,080, filed on Nov. 21, 2012.

(51) Int. Cl.
  *G09G 5/36* (2006.01)
  *G06F 13/00* (2006.01)

(52) U.S. Cl.
  USPC .......................................... 345/557; 345/537

(58) Field of Classification Search
  USPC .......................... 345/530, 536, 537, 538, 557
  See application file for complete search history.

(56) References Cited

U.S. PATENT DOCUMENTS

| 7,616,208 | B2 * | 11/2009 | Lauder | 345/530 |
|---|---|---|---|---|
| 2007/0252843 | A1 * | 11/2007 | Yu et al. | 345/557 |
| 2012/0147023 | A1 * | 6/2012 | Cho et al. | 345/557 |

* cited by examiner

*Primary Examiner* — Jacinta M Crawford
(74) *Attorney, Agent, or Firm* — Schwegman, Lundberg, Woessner, P.A.

(57) ABSTRACT

Systems and methods for an efficient display data transfer algorithm over a network are disclosed. A compressed frame buffer update transmitted from a server via a network is received by a hardware decompression engine. The hardware decompression engine identifies one or more palette entries indicated in the compressed frame buffer update and determines whether the one or more palette entries is stored in a palette cache of the hardware decompression engine. If the one or more palette entries is not stored in the palette cache, the hardware decompression engine writes the one or more palette entries from an external palette memory to the palette cache. Decompressed display data is generated based on the compressed frame buffer update using the palette cache. The decompressed display data is written to an output buffer of the hardware decompression engine.

46 Claims, 14 Drawing Sheets

SYSTEM AND METHOD FOR AN EFFICIENT DISPLAY DATA TRANSFER ALGORITHM OVER NETWORK

PRIORITY

This application is a continuation-in-part of and claims the benefit of priority under 35 U.S.C. §120 to U.S. patent application Ser. No. 13/684,080, entitled "SYSTEM AND METHOD FOR AN EFFICIENT DISPLAY DATA TRANSFER ALGORITHM OVER NETWORK," filed on Nov. 21, 2012, which is hereby incorporated by reference herein in its entirety.

TECHNICAL FIELD

Aspects of the present disclosure relate to the field of digital video and graphics processing. In particular, but not by way of limitation, example embodiments of the present disclosure concern techniques for efficiently processing graphics data transmitted over a network

BACKGROUND

In certain networked computer system environments, graphics data is sent to a computer system over a network. A full screen update for a computer system may require megabytes of data to be transmitted over the network. For example, a 1920 by 1080 monitor running in true color mode requires approximately 6 MB of data for a single frame and a throughput of 360 MB/sec to maintain a refresh rate of 60 Hz. With standard network speeds of 100 MB/sec or 1 GB/sec, such a transmission is not realistically possible. To account for this problem, it is common, in thin-client computing solutions, for a thin-client computer system to implement a display adapter with its own frame buffer memory. The frame buffer memory holds a recent copy of the frame and takes care of the 60 Hz refresh rate by repeating the frame. In addition, a compression algorithm is often used to transmit only screen update data that has changed over the network to avoid clogging the network. However, typical movie compression algorithms do not work very well with bitmap graphics data due to the lossy nature of these algorithms. For example, the clarity of text and static graphic images may be lost in the process of transmission.

BRIEF DESCRIPTION OF THE DRAWINGS

In the drawings, which are not necessarily drawn to scale, like numerals describe substantially similar components throughout the several views. Like numerals having different letter suffixes represent different instances of substantially similar components. The drawings illustrate generally, by way of example, but not by way of limitation, various embodiments discussed in the present document.

DETAILED DESCRIPTION

The following detailed description includes references to the accompanying drawings, which form a part of the detailed description. The drawings show illustrations in accordance with example embodiments. These embodiments, which are also referred to herein as "examples," are described in enough detail to enable those skilled in the art to practice the invention. It will be apparent to one skilled in the art that specific details in the example embodiments are not required in order to practice the present invention. For example, although an example embodiment is described with reference to thin-client terminal systems, the teachings of this disclosure may be used in any computer system with a digital display. The example embodiments may be combined, other embodiments may be utilized, or structural, logical and electrical changes may be made without departing from the scope what is claimed. The following detailed description is, therefore, not to be taken in a limiting sense, and the scope is defined by the appended claims and their equivalents.

In this document, the terms "a" or "an" are used, as is common in patent documents, to include one or more than one. In this document, the term "or" is used to refer to a nonexclusive or, such that "A or B" includes "A but not B," "B but not A," and "A and B," unless otherwise indicated. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

Computer Systems

Figure 1:
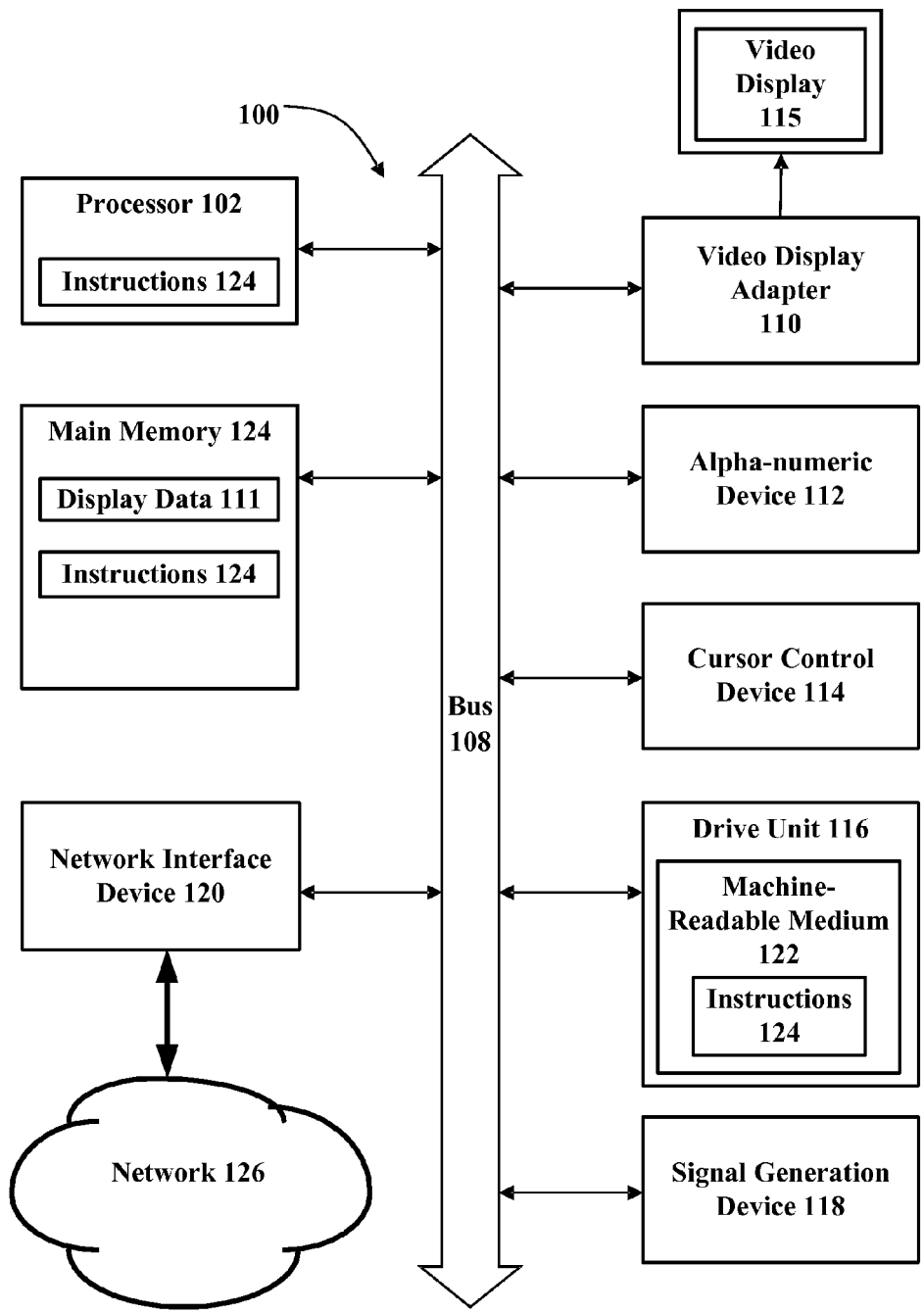
FIG. 1 illustrates a diagrammatic representation of a machine in the example form of a computer system within which a set of instructions, for causing the machine to perform any one or more of the methodologies discussed herein, may be executed.

The present disclosure concerns computer systems. FIG. 1 illustrates a diagrammatic representation of machine in the example form of a computer system 100 that may be used to implement portions of the present disclosure. Within computer system 100 there are a set of instructions 124 that may be executed for causing the machine to perform any one or more of the methodologies discussed herein. In a networked deployment, the machine may operate in the capacity of a server machine or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of computer instructions (sequential or otherwise) that specify actions to be taken by that machine. Furthermore, while only a single machine is illustrated, the term "machine" shall also be taken to include any collection of machines that individually or jointly execute a set (or multiple sets) of instructions to perform any one or more of the methodologies discussed herein.

The example computer system 100 includes a processor 102 (e.g., a central processing unit (CPU), a graphics processing unit (GPU) or both), and a main memory 104 that communicate with each other via a bus 108. The computer system 100 may further include a video display adapter 110 that drives a video display system 115 such as a Liquid Crystal Display (LCD) or a Cathode Ray Tube (CRT). The computer system 100 also includes an alphanumeric input device 112 (e.g., a keyboard), a cursor control device 114 (e.g., a mouse or trackball), a disk drive unit 116, a signal generation device 118 (e.g., a speaker) and a network interface device 120.

In many computer systems, a section of the main memory 104 is used to store display data 111 that will be accessed by the video display adapter 110 to generate a video signal. A section of memory that contains a digital representation of what the video display adapter 110 is currently outputting on the video display system 115 is generally referred to as a frame buffer. Some video display adapters store display data in a dedicated frame buffer located separate from the main memory. (For example, a frame buffer may reside within the video display adapter 110.) However, this application will primarily focus on computer systems that store a frame buffer in a shared memory system.

The disk drive unit 116 includes a machine-readable medium 122 on which is stored one or more sets of computer instructions and data structures (e.g., instructions 124 also known as 'software') embodying or utilized by any one or more of the methodologies or functions described herein. The instructions 124 may also reside, completely or at least partially, within the main memory 104 and/or within the processor 102 during execution thereof by the computer system 100, the main memory 104 and the processor 102 also constituting machine-readable media.

The instructions 124 may further be transmitted or received over a computer network 126 via the network interface device 120. Such transmissions may occur utilizing any one of a number of well-known transfer protocols such as the well known File Transport Protocol (FTP).

Some computer systems may operate in a terminal mode wherein the system receives a full representation of display data to be stored in the frame buffer over the network interface device 120. Such computer systems will decode the display data and fill the frame buffer with the decoded display data. The video display adapter 110 will then render the received data on the video display system 115. In addition, a computer system may receive a stream of full-motion video for display. The computer system must decode the full-motion video stream data such that the full-motion video can be displayed The video display adapter 110 must then merge that full-motion video data with display data in the frame buffer to generate a final display signal for the video display system 115.

In FIG. 1, the machine-readable medium 122 shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies described herein, or that is capable of storing, encoding or carrying data structures utilized by or associated with such a set of instructions. The term "machine-readable medium" shall accordingly be taken to include, but not be limited to, solid-state memories, optical media, and magnetic media.

For the purposes of this specification, the term "module" includes an identifiable portion of code, computational or executable instructions, data, or computational object to achieve a particular function, operation, processing, or procedure. A module need not be implemented in software; a module may be implemented in software, hardware/circuitry, or a combination of software and hardware.

Computer Display Systems

A video display for computer system is made up of a matrix of individual pixels (picture elements). Each pixel is the individual "dot" on the video display device. The resolution of a video display device is defined as the number of pixels displayed on the video display device. For example, a video display monitor with a resolution of 800×600 will display a total of 480,000 pixels. Most modern computer systems can render video in several different display resolutions such that the computer system can take advantage of the specific resolution capabilities of the particular video display monitor coupled to the computer system.

In a computer system with a color display system, each individual pixel can be any different color that can be generated by the display system. Each individual pixel is represented in the frame buffer of the memory system with a digital value that specifies the pixel's color. The number of different colors that may be represented is limited by the number of bits assigned to each pixel. The number of bits per pixel is often referred to as the color-depth.

A single bit per pixel frame buffer would only be capable of representing black and white. A monochrome display would require a small number of bits to represent various shades of gray. A "High Color" display system is defined as each pixel containing 16 bits of color data where there is with 5 bits of red data, 6 bits of green data, and 5 bits of blue data. "True Color" is defined as each pixel containing 24 bits of data, with 8 bits of Red data, Green data, Blue data (RGB) each. Thus, True Color mode is synonymous with "24-bit" mode, and High Color "16-bit" mode. Due to reduced memory prices and the ability of 24-bit (True Color) to convincingly display any image without much noticeable degradation, most computer systems now use 24 bit "True Color" color. Some video systems may also use more than 24 bits per pixel wherein the extra bits are used to denote levels of transparency such that multiple depths of pixels may be combined.

To display an image on a video display system, the video display adapter of a computer system fetches pixel data from the frame buffer, interprets the color data, and then generates an appropriate display signal that is sent to a display device such as a liquid crystal display (LCD) panel. Only a single frame buffer is required to render a video display. However, more than one frame buffer may be present in a computer system memory depending on the application.

In a personal computer system, the video adapter system may have a separate video frame buffer that is in a dedicated video memory system. The video memory system may be designed specifically for handling the task of display data. Thus, in most personal computers the rendering of a video display can be handled easily. However, in small computer systems such as mobile telephones, handheld computer systems, netbooks, and terminal systems, the computing resources tend to be much more limited. The computing resources may be limited due to cost, battery usage, heat dissipation, and other reasons. Thus, the task of generating a video display in a small computer system can be much more difficult. For example, a small computer system will generally have less CPU power, memory, and video display adapter resources than a personal computer system.

In a small computer system, there is often no separate video memory system. Thus, the video generation system must share the same memory as the rest of the small computer system. Since a video generation system must constantly read the entire frame buffer at high rate (generally 30 to 60 times per second), the memory bandwidth (the amount of data that can be read out of the memory system per unit time) can become a very scarce resource that limit functionality of the small computer system. Thus, it is important to devise methods of reducing the memory bandwidth requirements of applications within a small computer system.

Thin-Client Terminal System Overview

As set forth above, many different types of computer systems with limited resources may benefit from methods that reduce the memory bandwidth requirements The present application will focus on an implementation within a small computer terminal system known as a thin-client terminal system. A thin-client terminal system is an inexpensive small computer system that is only designed to receive user input and transmit that input to a remote computer system and receive output information from that remote computer system and present that output information to the user. For example, a thin-client terminal system may transmit mouse movements and keystrokes received from a user to a remote computer system and display video output data received from the remote computer system. No user application programs execute on the processor of a dedicated thin-client terminal system.

Modern thin-client terminal systems strive to provide all of the standard interface features that personal computers provide to their users. For example, modern thin-client terminal systems include high-resolution graphics capabilities, audio output, and cursor control (mouse, trackpad, trackball, etc.) input that personal computer users have become accustomed to using. To implement all of these features, modern thin-client terminal systems have small dedicated computer systems that implement all of the tasks such as decoding and rendering the video display and encoding the user inputs for transmission to the remote computer system.

Note that although the techniques set forth this document will be disclosed with reference to thin-client terminal systems, the techniques described herein are applicable in any other type of small computer system that needs to efficiently use limited computer resources. For example, any other small computer system that renders full-motion video such as mobile telephones, netbooks, slate computers, or other small systems may use the teachings of this document.

An Example Thin-Client System

Figure 2A:
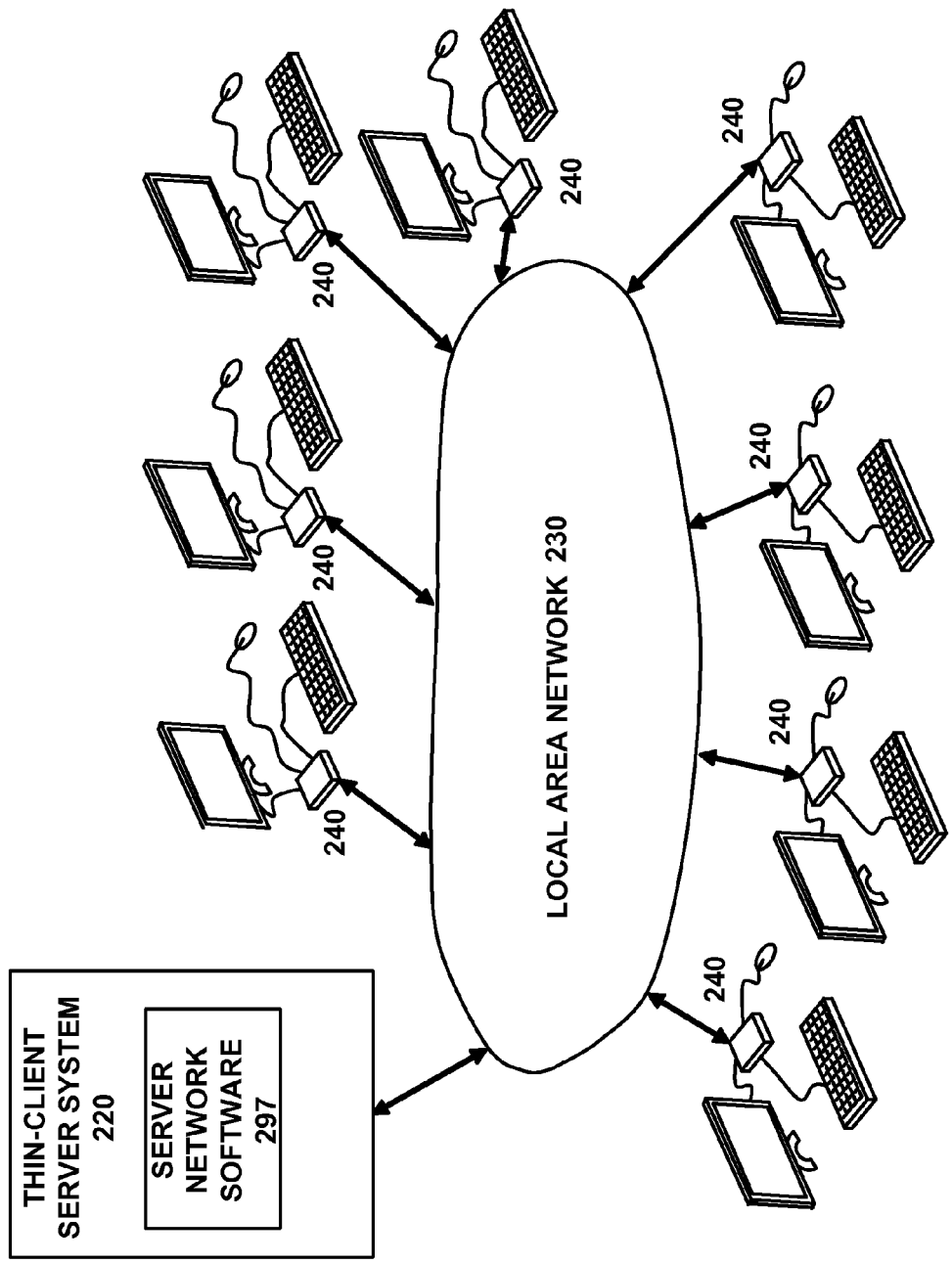
FIG. 2A illustrates a high-level block diagram of an example single thin-client server computer system supporting multiple individual thin-client terminal systems using a local area network, according to some embodiments.

FIG. 2A illustrates a conceptual diagram of a thin-client environment. Referring to FIG. 2A, a single thin-client server computer system 220 provides computer processing resources to many individual thin-client terminal systems 240. Computer applications execute on the server computer system 220 and the thin-client terminal systems 240 are used for displaying output and receiving user input.

In the embodiment of FIG. 2A, each of the individual thin-client terminal systems 240 is coupled to the thin-client server computer system 220 using local area network 230 as a bi-directional communication channel. The individual thin-client terminal systems 240 transmit user input (such as key strokes and mouse movements) across the local area network 230 to the thin-client server system 220 and the thin-client server system 220 transmits output information (such as video and audio) across the local area network 230 to the individual thin-client terminal systems 240. The individual thin-client terminal systems 240 are served using thin-client server network software 297 running on thin-client server computer system 220.

Figure 2B:
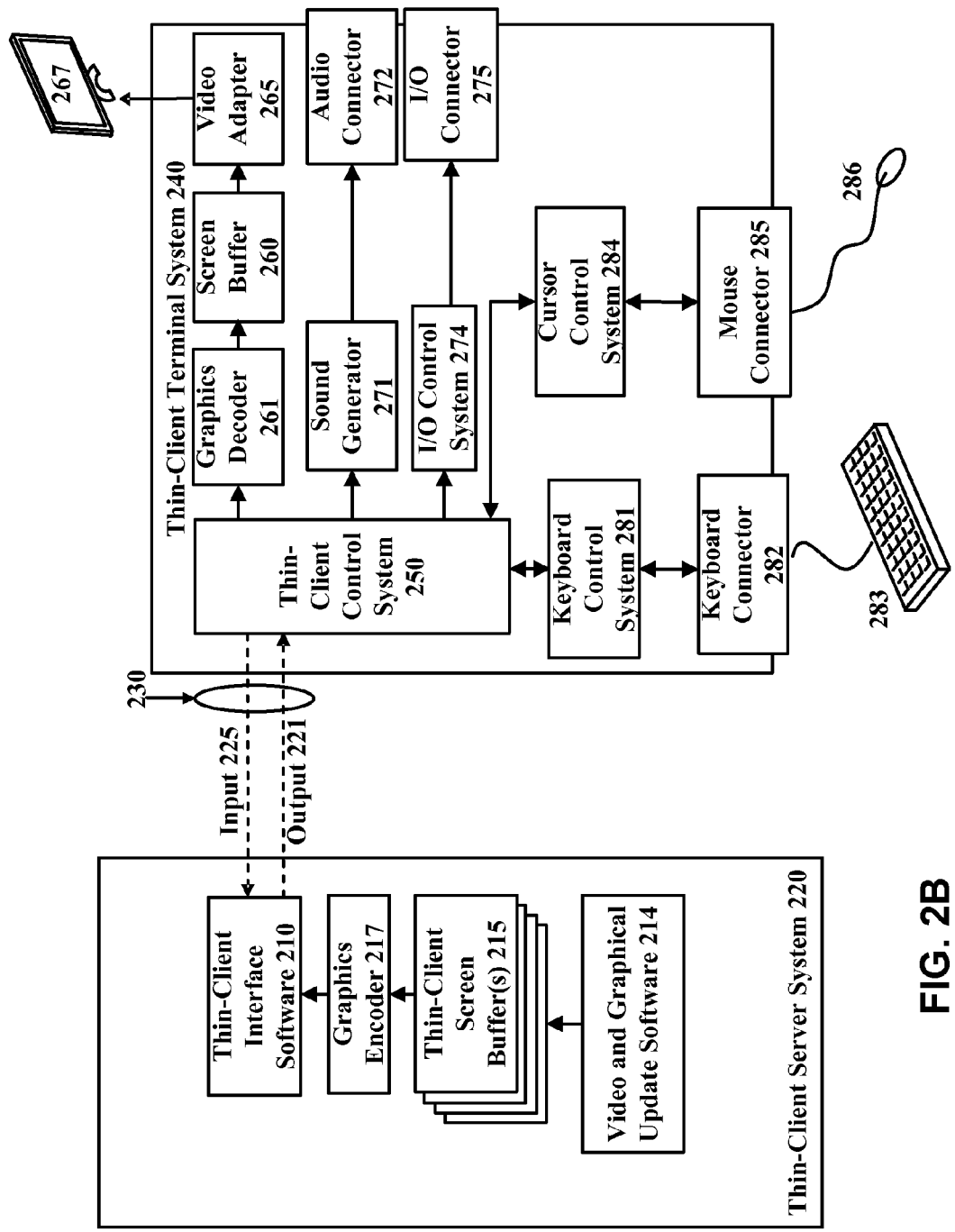
FIG. 2B illustrates a block diagram of an example thin-client terminal system coupled to a thin-client server computer system, according to some embodiments.

FIG. 2B illustrates a block diagram of a basic embodiment of a thin-client server computer system 220 coupled to one (of possibly many) thin-client terminal system 240. The thin-client server computer system 220 and thin-client terminal system 240 are coupled with a bi-directional digital communications channel 230 that may be a serial data connection, an Ethernet connection, or any other suitable bi-directional digital communication means such as the local area network 230 of FIG. 2A.

The goal of thin-client terminal system 240 is to provide most or all of the standard input and output features of a personal computer system to the user of the thin-client terminal system 240. However, this goal should be achieved at the lowest possible cost since if a thin-client terminal system 240 is too expensive, a personal computer system could be purchased instead of the inexpensive-client terminal system 240. Keeping the costs low can be achieved since the thin-client terminal system 240 will not need the full computing resources or software of a personal computer system. Those features will be provided by the thin-client server system 220 that will interact with the thin-client terminal system 240.

Referring back to FIG. 2B, the thin-client terminal system 240 provides both visual and auditory output using a high-resolution video display system and an audio output system. The high-resolution video display system consists of a graphics update decoder 261, a screen buffer 260, and a video adapter 265. When changes are made to a representation of a terminal's display in thin-client screen buffer 215 within the server system 220, a graphics encoder 217 identifies those changes in the thin-client screen buffer 215, encodes the changes, and then transmits the changes to the thin-client terminal system 240. In an example embodiment, the graphics encoder 217 may be a Joint Photographic Experts Group ("JPEG") encoder.

Within the thin-client terminal system 240, the graphics update decoder 261 decodes graphical changes made to the associated thin-client screen buffer 215 in the server 220 and applies those same changes to the local screen buffer 260 thus making screen buffer 260 an identical copy of the bit-mapped display information in thin-client screen buffer 215. Video adapter 265 reads the video display information out of screen buffer 260 and generates a video display signal to drive display system 267.

The audio sound system of thin-client terminal system 240 operates in a similar manner. The audio system consists of a sound generator 271 for creating a sound signal coupled to an audio connector 272. The sound generator 271 is supplied with audio information from thin-client control system 250 using audio information sent as output 221 by the thin-client server computer system 220 across bi-directional communications channel 230.

From an input perspective, thin-client terminal system 240 allows a terminal system user to enter both alpha-numeric (keyboard) input and cursor control device (mouse) input that will be transmitted to the thin-client computer system 220. The alpha-numeric input is provided by a keyboard 283 coupled to a keyboard connector 282 that supplies signals to a keyboard control system 281. The thin-client control system 250 encodes keyboard input from the keyboard control system 281 and sends that keyboard input as input 225 to the thin-client server system 220. Similarly, the thin-client control system 250 encodes cursor control device input from cursor control system 284 and sends that cursor control input as input 225 to the thin-client server system 220. The cursor control input is received through a mouse connector 285 from a computer mouse 285 or any other suitable cursor control device such as a trackball, trackpad, etc. The keyboard connector 282 and mouse connector 285 may be implemented with a PS/2 type of interface, a USB interface, or any other suitable interface.

The thin-client terminal system 240 may include other input, output, or combined input/output systems in order to provide additional functionality to the user of the thin-client terminal system 240. For example, the thin-client terminal system 240 illustrated in FIG. 2B includes input/output control system 274 coupled to input/output connector 275. Input/output control system 274 may be a Universal Serial Bus (USB) controller and input/output connector 275 may be a USB connector in order to provide Universal Serial Bus (USB) capabilities to the user of thin-client terminal system 240.

Thin-client server computer system 220 is equipped with multi-tasking software for interacting with multiple thin-client terminal systems 240. As illustrated in FIG. 2B, thin-client interface software 210 in thin-client server system 220 supports the thin-client terminal system 240 as well as any other thin-client terminal systems coupled to thin-client server system 220. The thin-client server system 220 keeps track of the state of each thin-client terminal system 240 by maintaining a thin-client screen buffer 215 in the thin-client server system 220 for each thin-client terminal system 240. The thin-client screen buffer 215 in the thin-client server system 220 contains representation of what is displayed on the associated thin-client terminal system 240.

Transporting Video Information to Terminal Systems

The bandwidth required to transmit an entire high-resolution video frame buffer from a server to a terminal at full refresh speeds is prohibitively large. Thus video compression systems are used to greatly reduce the amount of information needed to recreate a video display on a terminal system at a remote location. In an environment that uses a shared communication channel to transport the video display information (such as the computer network based thin-client environment of FIG. 2B), large amounts of display information transmitted to each thin-client terminal system 240 can adversely impact the computer network 230. If the video display information is not encoded efficiently enough, the large amount of display information may overwhelm the network 230 thus not allowing the system to function at all.

When the applications running on the thin-client server system 220 are typical office software applications (such as word processors, databases, spreadsheets, etc.), some simple techniques can be used to significantly decrease the amount of display information that must be delivered over the computer network 230 to the thin-client terminal systems 240 while maintaining a quality user experience for each terminal system user. For example, the thin-client server system 220 may only send display information across the computer network 230 to a thin-client terminal system 240 when the display information in the thin-client screen buffer 215 for that specific thin-client terminal system 240 actually changes. In this manner, when the display for a thin-client terminal system is static (no changes are being made to the thin-client screen buffer 215 in the thin-client server system 220), then no display information needs to be transmitted from the thin-client server system 220 to that thin-client terminal system 240. Small changes (such as a few words being added to a document in a word processor or the pointer being moved around the screen) will only require small updates to be transmitted.

As long as the software applications run by the users of thin-client terminal systems 240 do not change the display screen information very frequently, then the thin-client system illustrated in FIGS. 2A and 2B will work adequately. However, if some thin-client terminal system users run software applications that rapidly change the thin-client terminal's display screen (such as viewing full-motion video), the volume of network traffic over the computer network 230 will increase greatly due to the much larger amounts of graphical update messages that must be transmitted. If several thin-client terminal system 240 users run applications that display full-motion video then the bandwidth requirements for the communication channel 230 can become quite formidable such that data packets may be dropped. Dropped packets will greatly decrease the user experience.

To create a more efficient system for handling full-motion video in a thin-client environment, an improved full-motion system was disclosed in the related United States Patent Application titled "System And Method For Low Bandwidth Display Information Transport" having Ser. No. 12/395,152, filed Feb. 27, 2009, which is hereby incorporated by reference in its entirety. That disclosed system transmits full-motion video information to be displayed on a thin-client terminal system in an efficiently compressed format. The thin-client terminal system then decodes the compressed full-motion video to display the full-motion video locally. An example of this efficient system for transmitting full-motion video is illustrated in FIG. 3.

Figure 3:
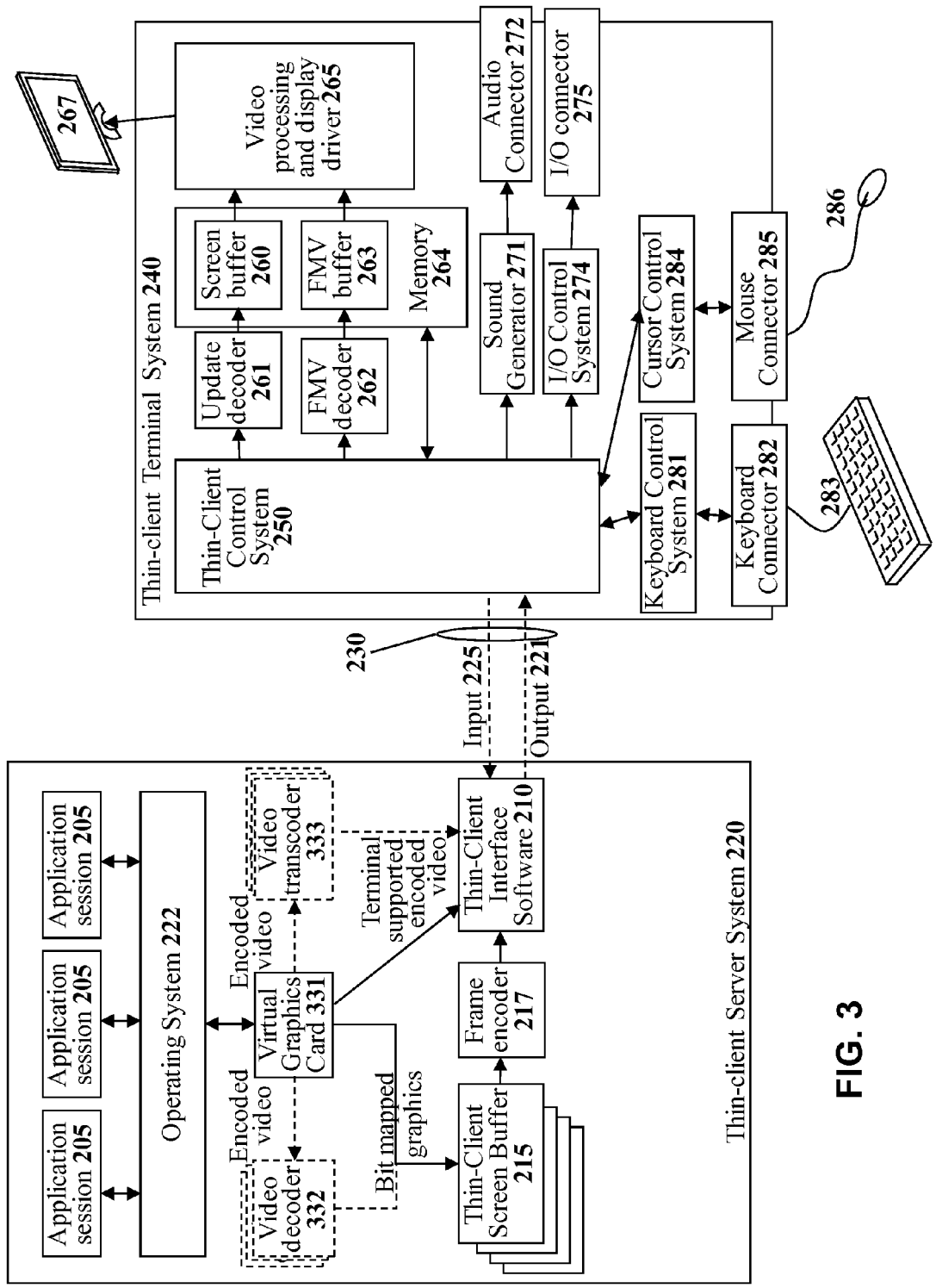
FIG. 3 illustrates a block diagram of a thin-client server computer system and thin-client terminal system that support a higher quality video stream decoded locally within the thin-client terminal system, according to some embodiments.

Referring to FIG. 3, a thin-client server system 220 and a thin-client terminal system 240 are displayed. The thin-client terminal system 240 of FIG. 3 is similar to the thin-client terminal system 240 of FIG. 2B with the addition of a full-motion video decoder module 262. The full-motion video decoder 262 may receive a full-motion video stream from thin-client control system 250, decode the full-motion video stream, and render the decoded video frames in a full-motion video buffer 263 in a shared memory system 264. The shared memory system 264 may be used for many different memory tasks within thin-client terminal system 240. In the example of FIG. 3, the shared memory system 264 is used to store information for a display screen frame buffer 260, a decoded full-motion video buffer 263, and other digital information from the thin-client control system 250.

The full-motion video decoder 262 may be implemented with software running on a processor, as a discrete off-the-shelf hardware part, as a digital circuit implemented with an Application Specific Integrated Circuit (ASIC), as a Field Programmable Gate Array, or in any other suitable method. In one embodiment, the full-motion video decoder 262 was implemented as a part of an Application Specific Integrated Circuit since several other portions of the thin-client terminal system 240 could also be implemented within the same ASIC device.

The video transmission system in the thin-client server computer system 220 of FIG. 3 must also be modified in order to transmit encoded full-motion video streams directly to the thin-client terminal system 240. Referring to the thin-client server system 220 of FIG. 3, the video system may include a virtual graphics card 331, thin-client screen buffers 215, and graphics encoder 217. Note that FIG. 3 illustrates other elements that may also be included such as full-motion video decoders 332 and full-motion video transcoders 333. For more information on those elements, the reader should refer to the related US patent application titled "System And Method For Low Bandwidth Display Information Transport" having Ser. No. 12/395,152, filed Feb. 27, 2009.

The virtual graphics card 331 acts as a control system for creating video displays for each of the thin-client terminal systems 240. In one embodiment, an instance of a virtual graphics card 331 is created for each thin-client terminal system 240 that is supported by the thin-client server system 220. The goal of the virtual graphics card 331 is to output either bit-mapped graphics to be placed into the appropriate thin-client screen buffer 215 for a thin-client terminal system 240 or to output an encoded full-motion video stream that is supported by the full-motion video decoder 262 within the thin-client terminal system 240.

The full-motion video decoders 332 and full-motion video transcoders 333 within the thin-client server system 220 may be used to support the virtual graphics card 331 in handling full-motion video streams. Specifically, the full-motion video decoders 332 and full-motion video transcoders 333 help the virtual graphics card 331 handle encoded full-motion video streams that are not natively supported by the digital video decoder 262 in thin-client terminal system. The full-motion video decoders 332 are used to decode full-motion video streams and place the video data thin-client screen buffer 215 (in the same manner as the system of FIG. 2B). The full-motion video transcoders 333 are used to convert from a first digital full-motion video encoding format into a second digital full-motion video encoding format that is natively supported by a video decoder 262 in the target thin-client terminal system 240.

The full-motion video transcoders 333 may be implemented as the combination of a digital full-motion video decoder for decoding a first digital video stream into individual decoded video frames, a frame buffer memory space for storing decoded video frames, and a digital full-motion video encoder for re-encoding the decoded video frames into a second digital full-motion video format supported by the target thin-client terminal system 240. This enables the transcoders 333 to use existing full-motion video decoders on the personal computer system. Furthermore, the transcoders 333 could share the same full-motion video decoding software used to implement video decoders 332. Sharing code would reduce licensing fees.

The final output of the video system in the thin-client server system 220 of FIG. 2B is either graphics update messages from the graphics frame buffer encoder 217 or an encoded full-motion video stream that is supported by the target thin-client terminal system 240. The thin-client interface software 210 outputs the graphics update messages and full-motion video stream information across communication channel 230 to the target thin-client terminal system 240.

In the thin-client terminal system 240, the thin-client control system 250 will distribute the incoming output information (such as audio information, frame buffer graphics, and full-motion video streams) to the appropriate subsystem within the thin-client terminal system 240. Thus, graphical frame buffer update messages will be passed to the graphics frame buffer update decoder 261 and the streaming full-motion video information will be passed to the video decoder 262. The graphics frame buffer update decoder 261 decodes the graphical frame buffer update messages and then applies the graphics update to the thin-client terminal's screen frame buffer 260. Similarly, the full-motion video decoder 262 will decode the incoming digital full-motion video stream and write the decoded video frames into the full-motion video buffer 263. As illustrated in FIG. 3, the terminal's screen frame buffer 260 and the full-motion video buffer 263 reside in the same shared memory system 264. The video processing and display driver 265 then reads all of the display information out of the terminal's screen frame buffer 260 and combines it with full-motion video information read from the full-motion video buffer 263 to render a final output display signal for display system 267. Thus, to handle the display of video output, the shared memory system 264 must receive updates from the frame buffer update decoder 261, receive decoded video frames from the full-motion video decoder 262, and output both frame buffer and full-motion video frames to the video processing and display driver 265. In addition, the shared memory system 264 must support other memory users such as a network interface and user interface.

Figure 4A:
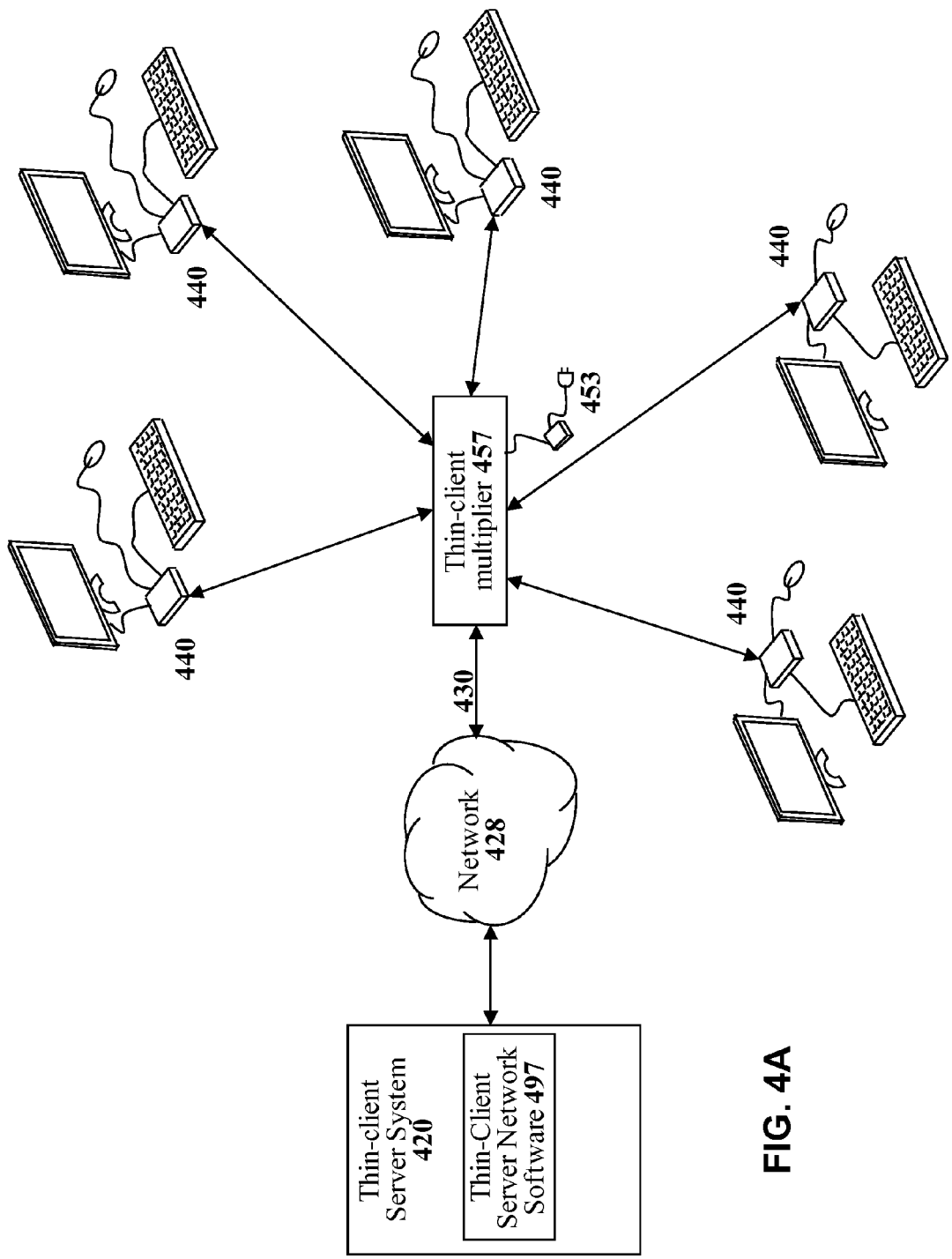
FIG. 4A illustrates a block diagram of three thin-client terminal systems coupled to a thin-client server system using a thin-client multiplier device, according to some embodiments.

In a system that supports multiple users, the memory bandwidth probably will become even more acute. FIG. 4A illustrates a thin-client terminal environment wherein a thin-client server system 420 is coupled through a network 428 to a thin-client multiplier 457 that serves five different thin-client terminal systems 440. In one embodiment, the thin-client multiplier 457 is a small computer system constructed with an Application Specific Integrated Circuit (ASIC) that outputs video signals for the three different thin-client terminal systems 440 using a shared memory system.

Figure 4B:
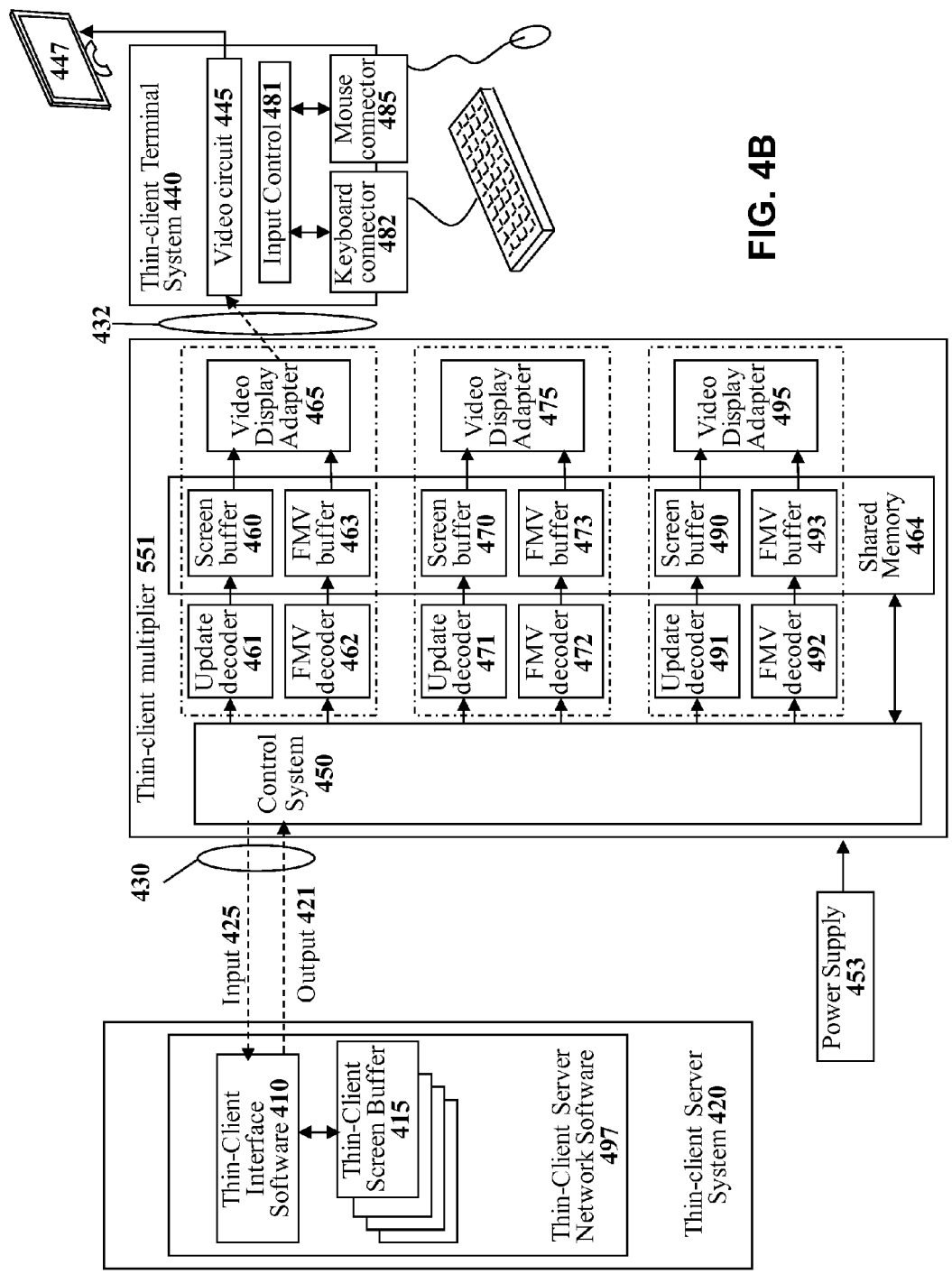
FIG. 4B illustrates a block diagram of a thin-client multiplier device that may support up to three thin-client terminal systems, according to some embodiments.

FIG. 4B illustrates a block diagram of the video display circuitry for a thin-client multiplier 451 that serves three different thin-client terminal systems using a single shared memory system 464. (Note that for clarity, FIG. 4B only displays one of the three thin-client terminal systems and does not display circuitry for handling terminal input data.) The single shared memory system 464 in the thin-client multiplier 451 handles all the incoming video display data for three screen buffers (460, 470, and 490) and three full-motion video buffers (463, 473, and 493). Similarly, there are three video display adapters (465, 475, and 495) for reading display data out the screen buffers (460, 470, and 490) and full-motion video buffers (463, 473, and 493) in order to generate video output signals to drive associated thin-client terminal systems. All of this video display activity will greatly stress the memory bandwidth limitations of the shared memory system 464.

Processing of Frame Buffer Graphics

In the thin-client environments of FIGS. 2A, 2B, and 3, the server system 220 may transmit graphics data to the thin-client terminal system 240 over a network. The graphics data transmitted may be such that the contents of the frame buffer of the thin-client terminal system 240 include a group of small rectangular regions that are combined to create a full display screen. Encoding changed sections of the screen frame buffer as smaller regions of the full display screen may provide greater efficiency in data transfer from the thin-client server system 220 to the thin-client terminal system 240. Specifically, referring to FIG. 3, the frame encoder 217 in the server system 220 may encode changed sections of the screen frame buffer 215 as small rectangular regions that are transmitted to the associated thin-client terminal system 240. In one embodiment, the small rectangular regions may be 8 pixel by 8 pixel "macro blocks" (i.e., 8 pixels wide and 8 pixels high) but other shapes and sizes may be used. Furthermore, completely different frame buffer encoding systems may be used. Whenever there is a change in a particular macro block, and if that macro block does not exist in a macro block cache maintained on the thin-client terminal system 240, the macro block is transmitted from the thin-client server system 220 to the thin-client terminal system 240. In some embodiments, the macro block that is transmitted is sent in a compressed form.

In some embodiments, the thin-client server system 220 may compare pixels within a macro block to determine whether 16 colors or less have been used to denote the pixels. In some embodiments, the comparison may be performed using statistical data collection. If the thin-client server system 220 determines that 16 colors or less have likely been used to denote the pixels in the macro block, the thin-client server system 220 may transmit a palette table for up to 16 colors to the thin-client terminal system 240 if the palette is not already present on the thin-client terminal system 240. If the thin-client terminal system 240 already has the palette, the thin-client server system 220 may instead transmit a table address for the palette entry associated with the palette. The thin-client server system 220 may also transmit to the thin-client terminal system 240 a bitmap that describes the macro block using up to 4 bits per pixel, where the bits used to describe each pixel of the macro block refer to the palette table for the colors of the pixels of the macro block. If the thin-client server system 220 determines that more than 16 colors have likely been used to denote the pixels in the macro block, the thin-client server system 220 may send a full bitmap for the macro block containing color data for each pixel (e.g., up to 8 pixels times 8 pixels times 3 bytes of color data per pixel), or a different technique for compressing the data may be used.

A frame buffer memory typically is a contiguous space where data for every column of a row of the screen stays next to each other before the next row starts (e.g., as the hardware draws the screen from left to right). Take an example where the display resolution is set to 1920 by 1080 pixels in true color (24-bit or 3 byte color) and an 8 by 8 macro block is to be written in the top left corner of the screen. From a memory perspective, the first 8 pixels of the macro block would start at an offset address of 0 with reference to the frame buffer. The second set of 8 pixels of the macro block would start at an offset address of 1920 pixels in a row of the screen times 3 bytes of color per pixel or at an offset address of 5760. With a 16-bit wide data bus to DDR2 frame buffer memory, a typical page size for the memory is 2 KB or 2048 bytes. As a result, when the write operation for the second set of 8 pixels begins, it is performed on a different page. With a busy memory system, this will cause a page miss, thereby adding an extra time penalty for writing to memory. In addition, in a typical system, the frame buffer memory is kept in a non-cacheable area. As a result, every row of 8 pixels in true color may require at best 6 single transfer 32-bit writes to memory. Compared to burst write transfers, single transfer write cycles are costly to memory throughput due to individual address phase and data phase transactions instead of single address phase, multiple data phase transactions.

Furthermore, today's memory devices generally perform burst transfers irrespective of the request length of the transfer. For a 16-bit DDR2 memory with a burst length of 4, it takes 2 clocks to perform a burst transfer. As a result, six single transfers take 12 clocks on the memory bus compared to 6 clocks for a burst transfer with a length of 6. Excluding the page miss time penalty, an 8 by 8 macro block transfer requires a total of 48 clocks. Using temporary storage inside the silicon to accumulate enough data for burst transfers to the frame buffer may increase the overall gain and improve the speed at which data is processed. For example, if eight consecutive 8 by 8 macro blocks are accumulated in a temporary storage in the silicon, 64 pixels (64 pixels times 3 bytes per pixel for true color or 192 bytes) per row may be transferred using three 16-beat burst cycles, totaling 48 clocks. To transfer 8 rows would take 48 clocks per row times 8 rows or 384 clocks. For the 1920 by 1080 display resolution example, this will incur 8 page misses in the best case and 24 page misses in the worst case. In contrast, if software were writing the macro blocks, the total number of clocks required would be 12*8*8 or 768 clocks with best case page misses of 8 per macro block or 64 total for eight 8 by 8 macro blocks. The worst case page miss penalty will depend on the system configuration.

To reduce network utilization, graphics data are typically sent over a network in a compressed format. Without any hardware support, the data is decompressed by a CPU through software. The process of decompression may require multiple memory accesses, with many of the accesses being byte accesses, thereby causing a slow display refresh at times. This problem may be worsened in a multi-user architecture as the CPU with the same available memory bandwidth has to cater to multiple users. Thus, a hardware decompression engine described in example embodiments disclosed herein proposes to avoid memory bottlenecks associated with software-implemented decompression and improve the rate of screen updates by utilizing a palette cache internal to the hardware decompression engine. The internal palette cache allows the decompression engine to more quickly access palette entries used to process a macro block by storing a subset of palette entries from the external palette memory (e.g., storing the most recently used palette entries), thereby reducing the number of times palette entries are accessed from the external palette memory and thus increasing the speed at which a macro block is processed. Additionally, the hardware decompression engine includes an output buffer that stores and manages processed graphics data and sends the processed graphics data to the frame buffer based on rules which provide efficient burst write transfers and reduced page misses.

The hardware decompression engine of the thin-client terminal system may receive compressed graphics data sent over a network and process the data on a macro block by macro block basis. The hardware decompression engine may manage the incoming compressed graphics data in a command queue until the decompression engine is ready to process graphics data for the next macro block. When a macro block is ready for processing, the decompression engine may use the commands in the compressed graphics data received to identify the palette entries associated with the colors of each pixel in the macro block and determine whether the palette entries for those colors are stored in the internal palette cache maintained by the decompression engine. If the palette entries for the macro block are not already stored in the internal palette cache, the decompression engine may access the appropriate palette entries from the external palette memory and update the internal palette cache with those palette entries. The palette entries in the internal palette cache may be used to decompress the graphics data, and the decompressed data may be sent to an output buffer of the decompression engine. The decompression engine may store decompressed macro blocks of data in the output buffer and may send decompressed macro blocks to the frame buffer using burst transfers of data. The burst transfers to the frame buffer may be performed in any manner which increases the efficiency at which memory is written to the frame buffer, such as performing the burst transfer in response to an occurrence of a predetermined condition.

Figure 5:
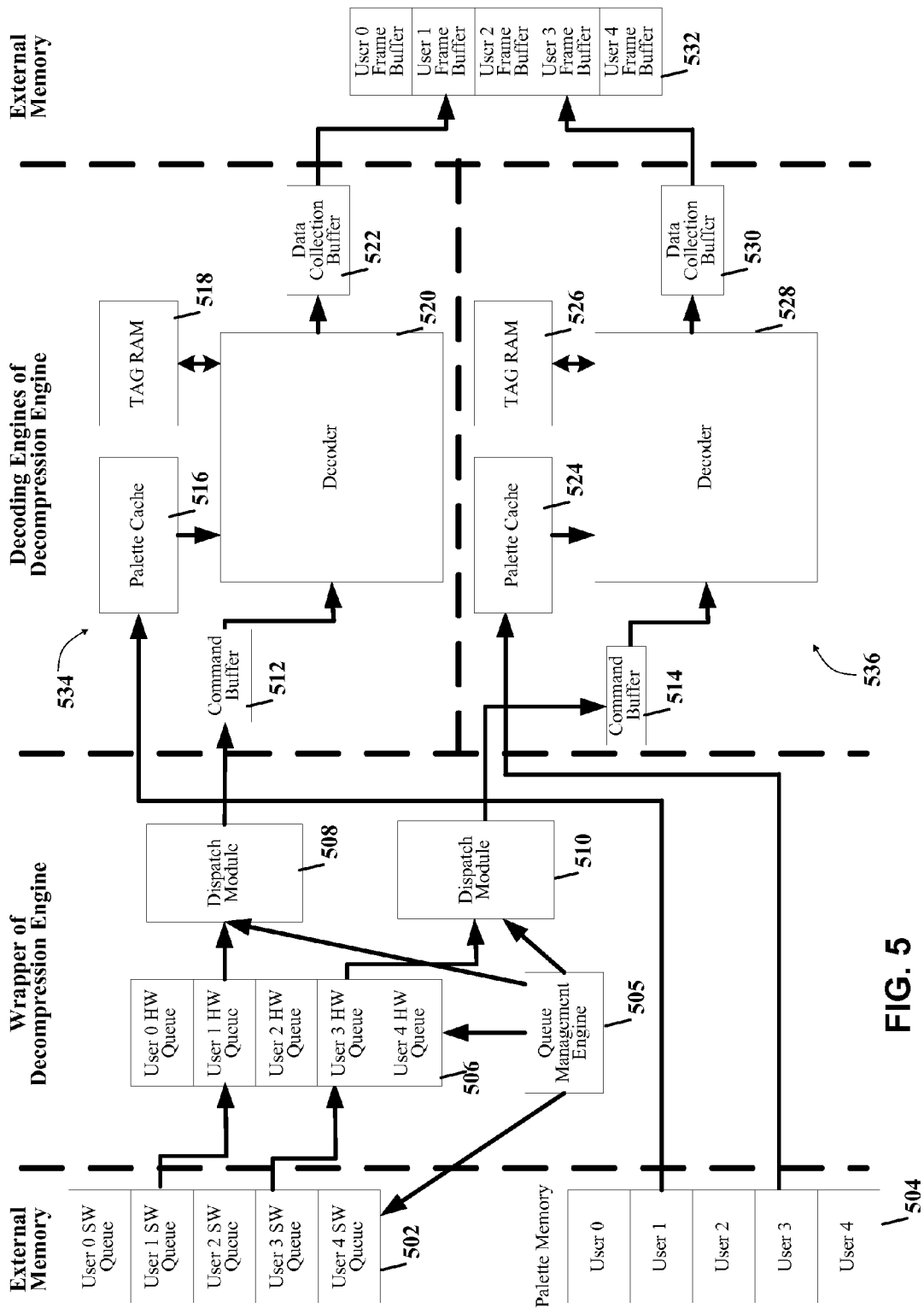
FIG. 5 illustrates a block diagram of an example system utilizing hardware decompression engines to process compressed frame buffer updates, according to some embodiments.

FIG. 5 illustrates a block diagram of an example system utilizing decoding engines 534 and 536 of the hardware decompression engine to process compressed frame buffer updates. One or more of the components of FIG. 5 may be included as part of the graphics decoder 261 shown in FIG. 2B. The two decoding engines 534 and 536 shown in FIG. 5 may each be included in a dedicated hardware decompression engine device (e.g., hardware chip) and may each be used to decompress graphics data. The utilization of a dedicated hardware device for decompression resolves the issues described above with respect to software-implemented decompression performed by the CPU of the thin-client terminal system. In the example of FIG. 5, decoding engine 534 may be part of a hardware device which includes command buffer 512, palette cache 516, tag random access memory (RAM) 518, decoder 520, and data collection buffer 522. The decoding engine 536 may also be part of a hardware device which includes command buffer 514, palette cache 524, tag RAM 526, decoder 528, and data collection buffer 530. While the example of FIG. 5 depicts two decoding engines, one of ordinary skill in the art will appreciate that any suitable number of decoding engines and any suitable configuration may be used for the hardware decompression engine.

The decompression engine system of FIG. 5 depicts an embodiment capable of supporting five users on one thin-client terminal system 240. However, one of ordinary skill in the art will appreciate that the system of FIG. 5 can be capable of supporting any number of users. The example described for FIG. 5 describes compressed frame buffer updates being processed for two users (User 1 and User 3). In the embodiment described for FIG. 5, compressed frame buffer updates for User 1 are processed using decoder 520 of the decoding engine 534, and compressed frame buffer updates for User 3 are processed using decoder 528 of the decoding engine 536. In some embodiments, compressed frame buffer updates for User 0 and User 1 may be processed using decoder 520 of the decoding engine 534, and compressed frame buffer updates for User 2, User 3, and User 4 may be processed using decoder 528 of the decoding engine 536. In such embodiments, since decoder 520 manages compressed frame buffer updates for two users and decoder 528 manages compressed frame buffer updates for three users, the wrapper of the hardware decompression engine may reallocate a user to dispatch module 508 so that decoder 520 may be used if decoder 528 is busier than decoder 520, and vice versa. The wrapper may identify the next command in the command queue and may allocate commands to the appropriate dispatch module such that the data collection buffers are written to the frame buffers in an efficient manner. However, one of ordinary skill in the art will appreciate that any other suitable arrangement may be used.

When a compressed frame buffer update is received at the thin-client terminal system 240 from the thin-client server system 220, the compressed frame buffer update, which may include bitstream data associated with the frame buffer graphics data and one or more commands indicating how to process the bitstream data, may be received in a particular protocol. In some embodiments, the thin-client control system 250 may convert the command in the compressed frame buffer update to a protocol that is compatible with the decompression engine.

The thin-client control system 250 may send the hardware-compatible compressed frame buffer update to a software-controlled command queue 502 located in memory external to the decoding engines 534 and 536. The software-controlled command queue 502 may store compressed frame buffer updates that are received from the thin-client terminal system 240 and that are awaiting processing by the decoding engines 534 and 536. The compressed frame buffer updates may then be sent from the software-controlled command queue 502 to a hardware-controlled command queue 506. The hardware-controlled command queue 506 may be controlled by the queue management engine 505 and, in some embodiments, may be a smaller data store (e.g., buffer) than the software-controlled command queue 502 (e.g., the hardware-controlled command queue 506 may operate similar to a First In, First Out (FIFO) buffer). Techniques for storing the compressed frame buffer updates in the software-controlled command queue 502 and the hardware-controlled command queue 506 will be described in more detail below.

When the decoding engines 534 and 536 are ready to receive compressed frame buffer updates, the dispatch module 508 used for User 1 and dispatch module 510 used for User 3 may each retrieve the next compressed frame buffer update from the hardware-controlled command queue 506 and send that compressed frame buffer update to the respective command buffer 512, 514 of the respective decoding engines 534 and 536. The compressed frame buffer update for User 1 waits in the command buffer 512 until the decoder 520 is ready to process the next compressed frame buffer update. Similarly, the compressed frame buffer update for User 3 waits in the command buffer 514 until the decoder 528 is ready to process the next frame buffer update.

A queue management engine 505 shown in FIG. 5 may manage information about whether the compressed frame buffer updates currently being processed by decoder 520 or the decoder 528 are finished being processed. When the compressed frame buffer updates being decompressed by the decoder 520 or the decoder 528 are finished processing, the decoder 520 or the decoder 528 may notify the queue management engine 505 that processing is complete, and in response, the queue management engine 505 may retrieve the next compressed frame buffer update in the respective command buffer 512, 514 so that the next compressed frame buffer update can be decompressed.

When a compressed frame buffer update is being decompressed by either the decoder 520 or the decoder 528, the respective decoder may determine whether the palette entries for decoding the compressed frame buffer update are already stored in the respective internal palette cache 516, 524. If the palette entries for the particular compressed frame buffer update are not already stored in the respective internal palette cache 516, 524, the appropriate palette entries may be retrieved from the palette memory 504 that is external to the hardware decoding engines 534 and 536. In some embodiments, the external palette memory 504 may store a set of palette entries for each user supported on the thin-client terminal system 240.

Once the appropriate palette entries are stored in the palette cache 516, 524, the decoder 520, 528 may decode the compressed frame buffer update using the palette cache 516, 524 based on the command specified in the compressed frame buffer update. The compressed frame buffer update may use the tag random access memory (RAM) 518, 526 to process the compressed frame buffer update. The tag RAM 518, 526 will be described in more detail below.

Compressed frame buffer updates that have been processed may be sent to the respective data collection buffer 522, 530. The data collection buffer 522, 530 may be an output buffer that holds decompressed frame buffer updates and sends the decompressed frame buffer updates to the frame buffer 532 based on one or more rules relating to timing associated with sending the decompressed frame buffer updates. These rules may be specified by commands associated with the compressed frame buffer update and may provide for efficient data transfer to the frame buffer 532, as described in more detail below for FIG. 10. In some embodiments, the decompressed frame buffer updates may be sent in a manner which efficiently transmits bursts of data to the frame buffer 532 in a manner which reduces the number of page misses that may ordinarily occur when writing to the frame buffer 532 (e.g., sending in response to the occurrence of a predetermined condition). The manner of transmitting data to the frame buffer 532 will be described in more detail below.

Figure 6:
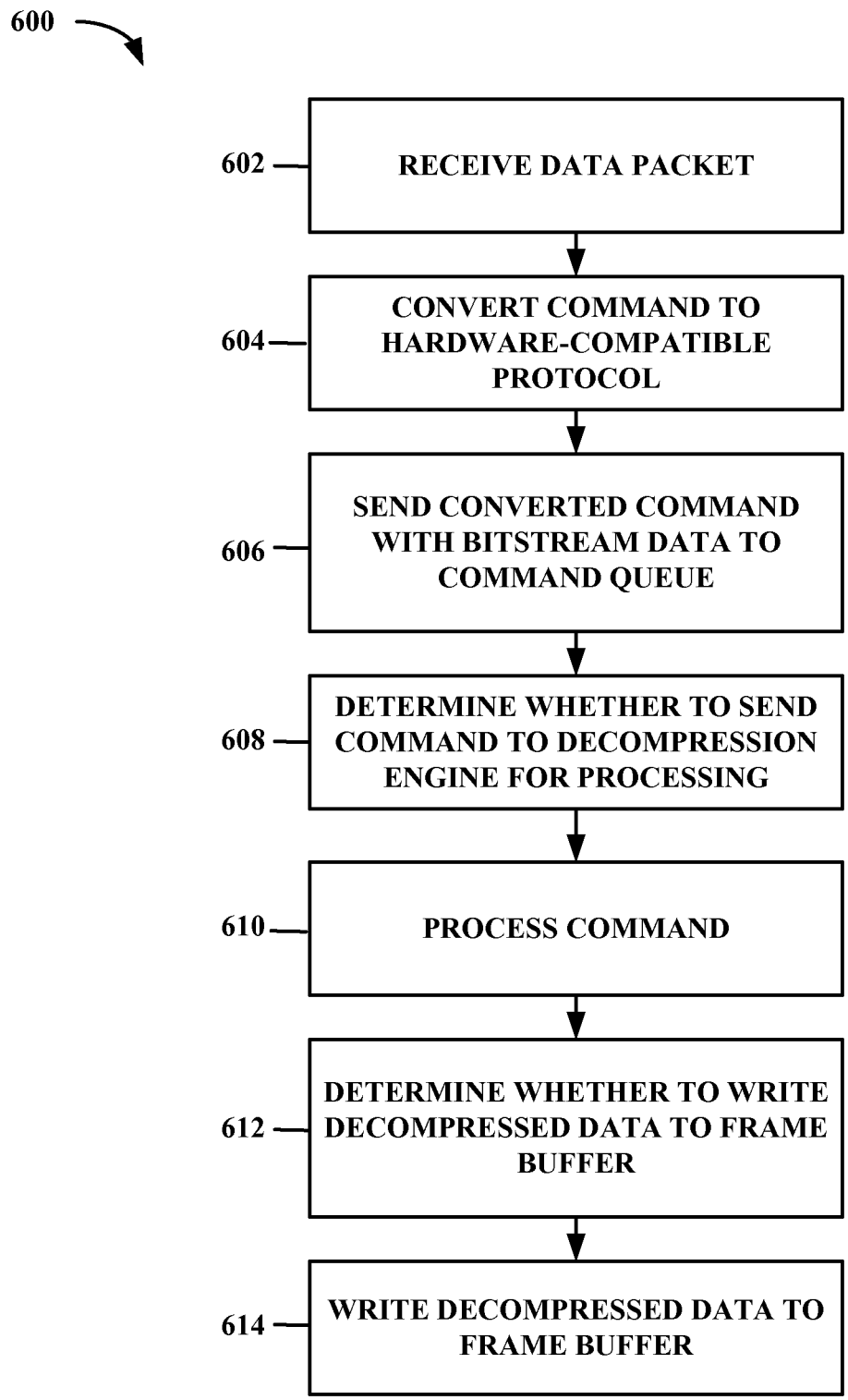
FIG. 6 illustrates a flowchart of an example method for processing a data packet associated with a frame buffer update, according to some embodiments.

FIG. 6 illustrates a flowchart of an example method 600 for processing a data packet associated with a frame buffer update. In operation 602, the thin-client terminal system 240 may receive a data packet with the compressed frame buffer update transmitted from the thin-client server system 220. As described above, the data packet may include a command for processing the graphics data in the data packet. In some embodiments, the command may be in a protocol that is different than a protocol that is compatible with the decompression engine hardware.

In operation 604, the thin-client control system 250 may convert the command to hardware-compatible protocol such that the command can be processed by the decompression engine hardware.

In operation 606, the converted command with the bitstream data from the received data packet may be sent to the command queue for storage until the data can be decoded by the decoder of the decompression engine. This may include sending the compressed frame buffer update to the software-controlled command queue 502 and subsequently to the hardware-controlled command queue 506. The command queues will be described in more detail below.

In operation 608, the queue management engine determines whether the next compressed frame buffer update can be decoded based on a notification received from the decompression engine notifying the queue management engine that processing is complete for the compressed frame buffer update that was being processed. Processing of the compressed frame buffer update may be managed using registers. For example, registers may be set to indicate that the processing should start, that processing is finished, that the compressed frame buffer update is for a macro block with a solid fill color, and the like. For example, the queue management engine may determine that the next compressed frame buffer update can be processed if the "done" register bit is set to 1, indicating that processing has finished for the last frame buffer update decoded. If the queue management engine determines that the "done" register bit is 1, the queue management engine may prepare the next compressed frame buffer update for processing, which may include putting the compressed frame buffer update in a data structure associated with the decompression engine. Once the compressed frame buffer update is in the data structure, the queue management engine may set the "start" register bit such that the register indicates processing may begin for the compressed frame buffer update, and the queue management engine may also set the "done" register bit to zero.

In operation 610, the command is processed, which includes checking if the appropriate palette entries are in the palette cache, accessing any palette entries from the external palette memory if needed, and decoding the compressed frame buffer update. Once the command is processed, the "done" register bit is reset to 1, indicating processing is finished. The decompressed data is then sent to the output buffer of the decompression engine.

In operation 612, the decompression engine determines whether to send the decompressed frame buffer updates that are stored in the output buffer to the frame buffer. As described above, the output buffer may send decompressed frame buffer updates in a manner such that the data is transferred efficiently to the frame buffer. The decompressed frame buffer updates may be sent from the output buffer to the frame buffer based on any rules specified for the frame buffer update or based on the occurrence of a predetermined condition. Those rules may be indicated in a command portion of an input data structure for the frame buffer update. For example, data may be written to the frame buffer when there is enough data in the output buffer for a particular number of burst transfers based on a specified command (which may result in the data being written to the frame buffer more quickly than it would for single write transfers, as discussed above), if a flush command is sent to the output buffer, if the data received is for macro blocks having non-sequential destination addresses, if the data stored in the output buffer has reached a particular limit, if the output buffer times out (e.g., decompression engine may use a programmable counter that is reset after a each command is processed to track and manage data transfer from output buffer to frame buffer), and the like.

In operation 614, if the decompression engine determines that the decompressed frame buffer updates should be sent from the output buffer to the frame buffer, the decompressed frame buffer updates are written to the frame buffer.

Figure 7A:
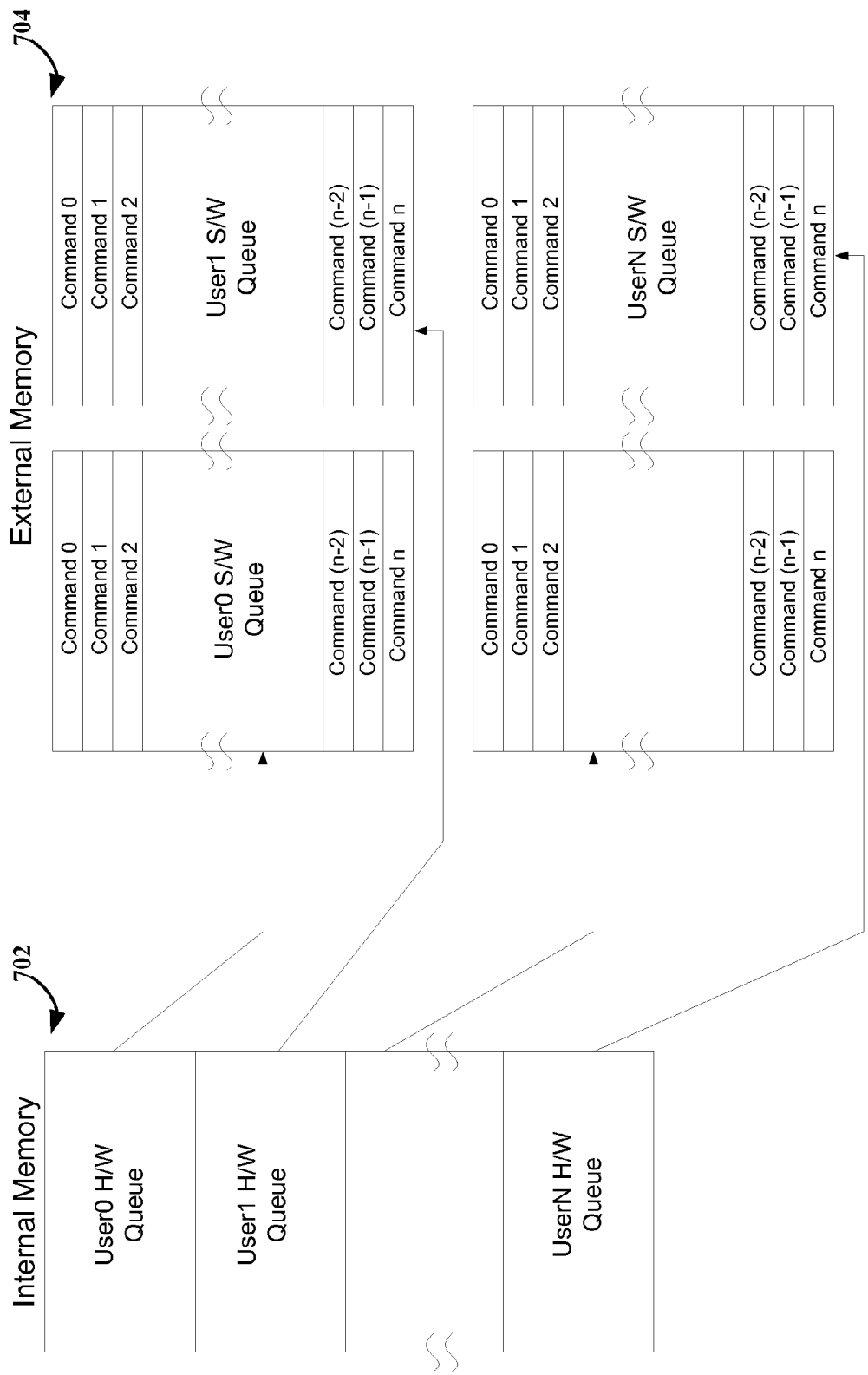
FIG. 7A illustrates a block diagram of example internal and external memory storing command queues, according to some embodiments.

As previously described, the commands received from the thin-client server system for compressed frame buffer updates are passed to the decompression engine through command queues. A hardware state machine may be responsible for checking the status of the decompression engine and submitting the next command to the hardware-controlled command queue. In one embodiment, two queues are maintained for incoming commands. FIG. 7A illustrates a block diagram of example internal memory 702 that is internal to the hardware decompression engine and external memory 704 that is external to the hardware decompression engine, both of which store command queues for a multi-user system. A software-controlled command queue is maintained in the external memory 704 which may be RAM that is external to the decompression engine. A hardware-controlled command queue is maintained in the internal memory 702 which may be RAM that is internal to and controlled by the hardware decompression engine. In some embodiments, the command queues in the external memory 704 may be software and hardware-controlled command queues. The dispatch modules 508 and 510 shown in FIG. 5 may control data being moved in and out of the internal memory 702 and the external memory 704. As commands move out of the queues to be processed, another command is moved into the queue to await its turn for processing.

Figure 7B:
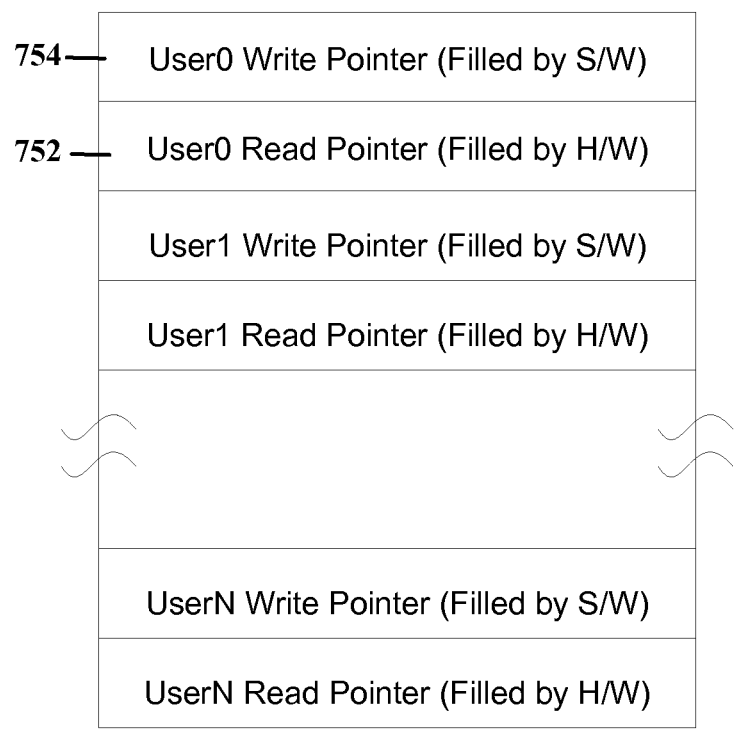
FIG. 7B illustrates a block diagram of example command queue pointers used by the queue management engine to manage the command queues, according to some embodiments.

FIG. 7B illustrates a block diagram of example command queue pointers used by the queue management engine to manage the command queues. The read pointers (e.g., read pointer 752 for User 0) and write pointers (e.g., write pointer 754 for User 0) and the status of the commands can be read by both the CPU of the thin-client terminal system and the decompression engine hardware. The write pointer may be updated by the thin-client terminal system CPU, and the read pointer may be updated by the decompression engine. A programmable upper threshold at least equal to the network roundabout time may be set as part of a backpressure mechanism to prevent overflow in the external command queue. The internal command queue may be maintained by the decompression engine and may have programmable lower and upper thresholds. The lower threshold may control the request to use the hardware decompression core, and the upper threshold controls the request to get the next set of commands from the external command queue.

In a multi-user system, each user may be associated with its own external and internal command queue. In case of a multi-user system with "m" number of users and "n" number of hardware decompression cores, where m>n, an arbiter may be used to select which requesting user queue will get to use the associated decompression resource. In some embodiments, software decompression that does not utilize the hardware decompression engine may be used for some users if the decompressor cores are busy with processing commands for other users. This may be determined by keeping track of the upper thresholds of the internal and external command queues for a user. If the external command queue is reaching its upper threshold and the internal command queue is not emptying fast enough, a flag may be set for that user. Once the flag is set, the hardware internal command queue may not request commands from the external queue and instead may interrupt the thin-client terminal system to request that the command queue be sent to the software decompression engine for decompression until the external queue reaches an acceptable threshold.

Figure 8:
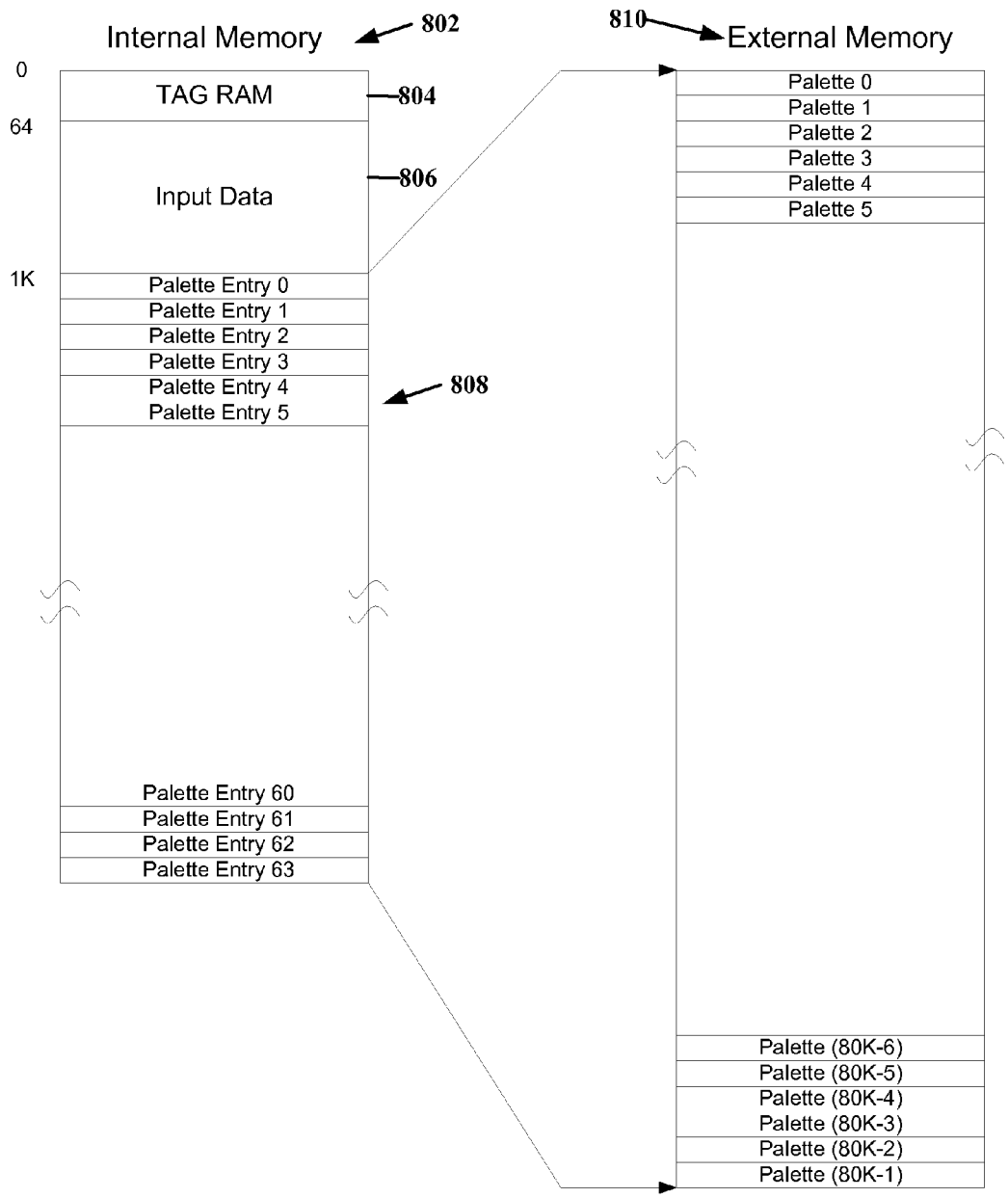
FIG. 8 illustrates a block diagram of example internal and external memory storing palette entries, according to some embodiments.

FIG. 8 illustrates a block diagram of example internal memory 802 and external memory 810 storing palette entries. The example internal memory 802 that is internal to the decompression engine may include tag RAM 804, input data RAM 806 for storing the compressed frame buffer update being processed by the decompression engine, and a palette cache 808 having recently used palette entries (e.g., palette entry 0 in internal memory 802). The palette cache 808 shown in FIG. 8 may be a 4-way set-associative palette cache with up to 64 palette entries. However, one of ordinary skill in the art will appreciate that any suitable external memory size and configuration may be used.

The external memory 810 that is external to the decompression engine may include palette memory having palette entries (e.g., palette 0 in external memory 810) associated with compressed frame buffer updates. The external memory 810 shown in FIG. 8 includes 80,000 palette entries, where each entry may have up to 16 colors each being represented by up to 24 bits (e.g., true color). However, one of ordinary skill in the art will appreciate that any suitable external memory size and configuration may be used. As described above, the palette cache of the internal memory may contain palette entries that are a subset of the set of palette entries stored in the external memory.

Figure 9:
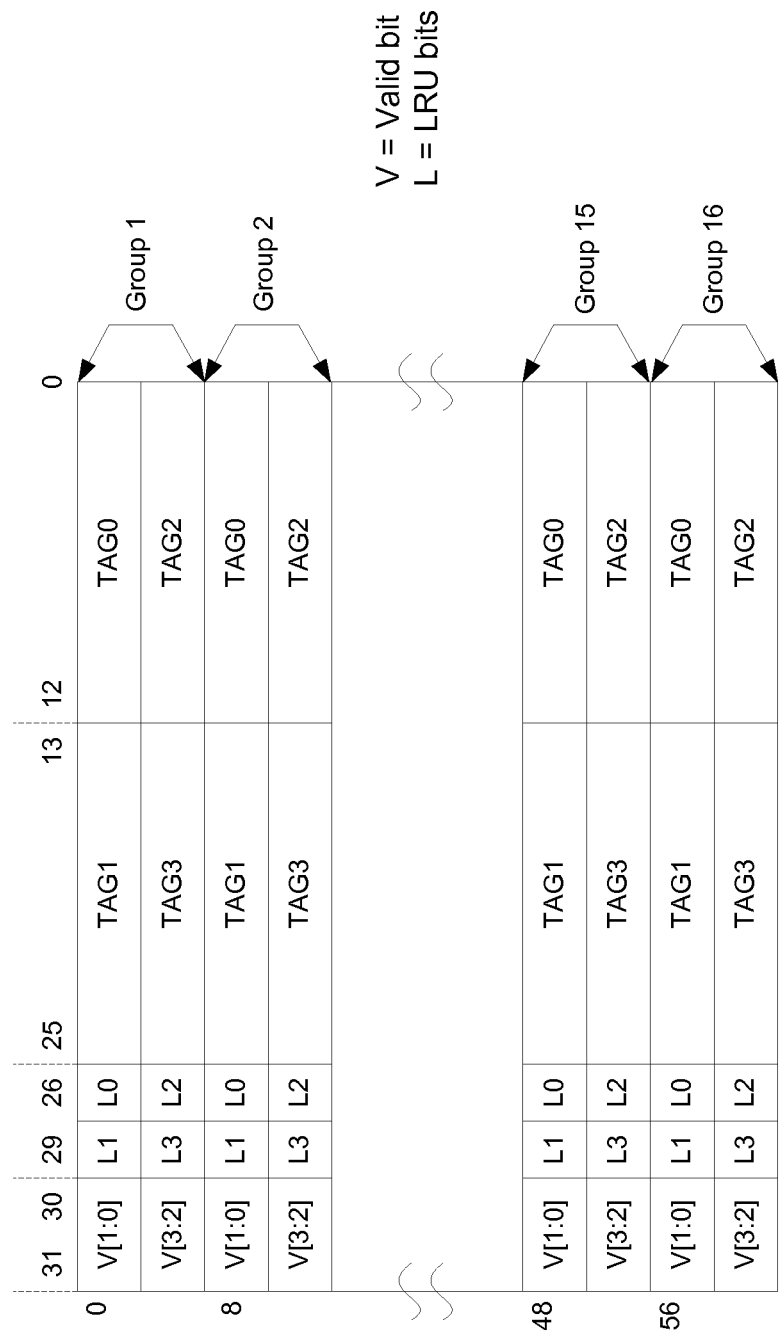
FIG. 9 illustrates a block diagram of an example tag random access memory, according to some embodiments.

FIG. 9 illustrates a block diagram of an example of tag RAM. In the example shown in FIG. 9, the lower order 4 bits of the palette offset address in the table are used to address and access the tag RAM. Each tag address may accommodate any number of palette entries appropriate to the implementation. In the example of FIG. 9, each tag address may accommodate up to 4 different palettes in the four-way set-associative tag RAM structure shown. Additionally, each tag address may contain least recently used bits (LRU bits or L bits) for each tag entry to indicate the number of times the palette entry has been accessed. Based on the usage pattern for palette entries, whenever a replacement of palette entries in the internal palette cache is needed, the tag entry with the least number of accesses will be evicted from the internal palette cache.

Figure 10:
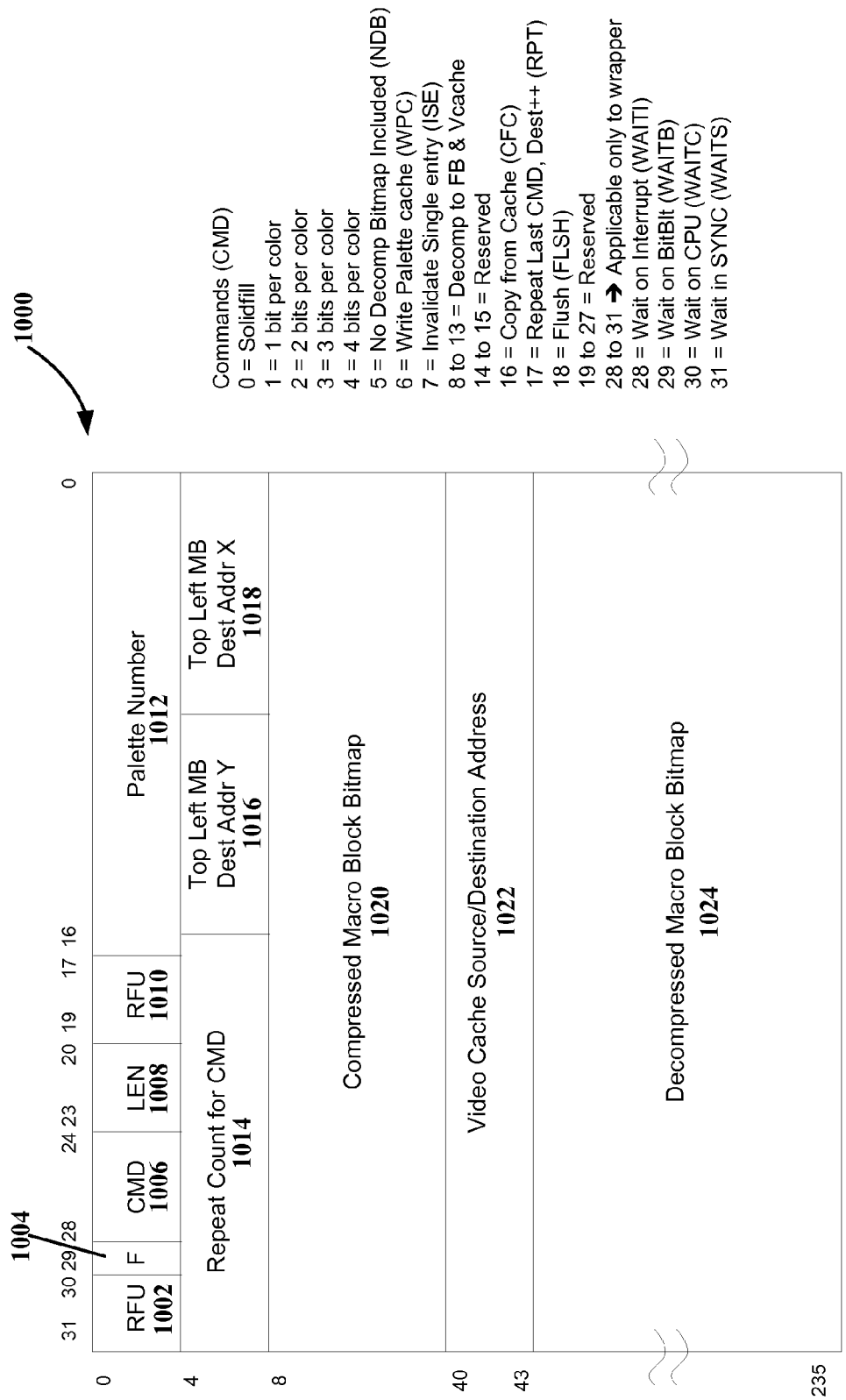
FIG. 10 illustrates a block diagram of an example input data structure, according to some embodiments.

FIG. 10 illustrates a block diagram of an example input data structure 1000 for a compressed frame buffer update being processed by the decompression engine. The input data structure 1000 shown in FIG. 10 is one of many examples of input data structures that can be used by the decompression engine, and one of ordinary skill in the art will appreciate that any suitable input data structure may be used.

The reserved for future use (RFU) portions 1002 and 1010 of the input data structure 1000 may be place holders that may be utilized in the future for additional data that may be included and used when processing a compressed frame buffer update.

The flush (F) portion 1004 of the input data structure 1000 may be set if the output buffer is to be flushed after the command in the compressed frame buffer update is processed. The wrapper of the decompression engine may determine that the flush (F) portion 1004 of the input data structure 1000 may be set for any appropriate circumstance. For example, the wrapper may identify the next command in the command queue and determine that the flush (F) portion 1004 of the input data structure 1000 may be set for that command. The flush (F) portion 1004 may be set for any commands or circumstances which may likely result in the output buffer becoming full or to increase the efficiency with which the output buffer is written to the frame buffer. For example, if the compressed frame buffer update includes a long repeat call, the flush (F) portion 1004 may be set by the wrapper, and the output buffer may perform multiple burst write transfers to write the data in the output buffer to the frame buffer in response to the flush (F) portion 1004 being set, where any leftover data may be written to the frame buffer using single write transfers. In other examples, the wrapper of the decompression engine may determine that the flush (F) portion 1004 of the input data structure 1000 may be set for the last of a series of commands if it appears that the output buffer may be filled to a particular limit, if there is a lengthy repeat call, if there is a mix of commands and short repeats that cross a particular boundary, if there is a macro block set with consecutive commands, if there is a macro block with a non-consecutive command, the flush (F) portion 1004 may be set for the current command if the next command is not available in the hardware command queue, and the like. In some embodiments, shorter consecutive repeat counts may cause the wrapper to set the flush (F) portion 1004 of the input data structure 1000 for the last command in the sequence. In some embodiments, the flush (F) portion 1004 may be set by the wrapper in a manner which allows for efficient use of the decoders of the hardware decompression engine. For example, if the wrapper determines that a particular decoder is busier than another decoder, the wrapper may send a particular number of commands to the other decoder and set the flush (F) portion 1004 accordingly.

The length (LEN) portion 1008 of the input data structure 1000 may specify the length associated with the input data structure 1000 being processed. The length of the input data structure 1000 may depend on the type of command being processed.

The palette number portion 1012 of the input data structure 1000 may specify the location for the corresponding palette entry in the external palette memory for each pixel in the macro block being processed.

The command (CMD) portion 1006 of the input data structure 1000 may specify the command to be used to process the macro block, where the location of the macro block on the screen is identified using the top-left x,y coordinate for the macro block indicated in the Top Left MB Dest Addr X portion 1018 and the Top Left MB Dest Addr Y portion 1016 of the input data structure 1000. Examples of possible commands (e.g., CMD 0-31) that may be specified in the CMD portion 1006 of the input data structure 1000 are listed in FIG. 10. For example, if CMD=0, the macro block may have pixels that are all associated with one palette entry (e.g., macro block is one solid color). If CMD=1, each of the colors of the pixels in the macro block may be represented by 1 bit of data (e.g., the pixels in the macro block are one of two possible colors represented by 0 or 1). If CMD=2, each of the colors of the pixels in the macro block may be represented by 2 bits of data (e.g., the pixels in the macro block are one of four possible colors represented by 00, 01, 10, or 11). If CMD=3, each of the colors of the pixels in the macro block may be represented by 3 bits of data (e.g., the pixels in the macro block are one of 8 possible colors each represented by 3 bits of data). If CMD=4, each of the colors of the pixels in the macro block may be represented by 4 bits of data (e.g., the pixels in the macro block are one of 16 possible colors each represented by 4 bits of data).

The compressed macro block bitmap portion 1020 of the input data structure 1000 may be used to store compressed macro block bitmap data received from the thin-client server system. If CMD=0-4, the compressed macro block bitmap portion 1020 may contain a bitmap of bits of data that represent each of the colors of the pixels in the macro block, as described above for CMD=0-4. Thus, if CMD=0, the compressed macro block bitmap portion 1020 may contain zero bits of data. If CMD=1, the compressed macro block bitmap portion 1020 may contain 8 bytes of data (1 bit/color). If CMD=2, the compressed macro block bitmap portion 1020 may contain 16 bytes of data (2 bit/color). If CMD=3, the compressed macro block bitmap portion 1020 may contain 24 bytes of data (3 bit/color). If CMD=4, the compressed macro block bitmap portion 1020 may contain 32 bytes of data (4 bit/color).

If CMD=5, there is no bitmap for macro block data that needs to be decompressed provided in the compressed macro block bitmap portion 1020 of the input data structure 1000 received at the decompression engine. Instead, the decompressed macro block bitmap portion 1024 of the input data structure 1000 may store a bitmap of decompressed data for the macro block identifying the palette entries for the appropriate colors for each pixel in the macro block. If the macro block is in true color, the decompressed macro block bitmap portion 1024 of the input data structure 1000 may contain 192 bytes of data. If the macro block is in high color, the decompressed macro block bitmap portion 1024 of the input data structure 1000 may contain 128 bytes of data.

If CMD=6, the command indicates that the palette needed to decompress the frame buffer update is not currently present in external memory and thus needs to be written to the external palette memory. When the CMD=6, the needed palette cache entry may be found in the compressed macro block bitmap portion 1020 of the input data structure 1000 and added to the external palette memory.

If CMD=7, this may indicate that a single palette entry should be invalidated. In this case, the LRU bits and valid bits of the tag RAM entry may be updated to invalidate any one of the entries in a tag line of the tag RAM.

If CMD=8 to 13, any of these commands may indicate that the compressed frame buffer update, data for which may be stored in the compressed macro block bitmap portion 1020 of the input data structure 1000, should be decompressed and sent to the frame buffer and to a video cache (vCache), as specified by the indicated command. This command may utilize the video cache source/destination address portion 1022 of the input data structure 1000 to determine source and destination addresses for the data to be sent to the video cache. The video cache may be maintained such that it holds recently used macro blocks. In some embodiments, the video cache may contain the bitmap copy of the macro block. If a macro block is already available in the video cache, the system may transfer the macro block from the video cache to the frame buffer instead of decompressing the compressed frame buffer update to save decompression time. The decompression engine may continue checking for consecutive macro blocks to write to the frame buffer while concurrently writing to the video cache after each macro is decompressed.

As shown in FIG. 10, CMD=14 to 15 and 19 to 27 are placeholders reserved for future commands that may be utilized by the decompression engine.

If CMD=16, the decompression engine may copy a macro block from the video cache source/destination address portion 1022 of the input data structure 1000 to the output buffer. This command is executed by the hardware decompression engine instead of by software executed on the thin-client terminal system CPU, thus providing a more efficient frame buffer update.

If CMD=17, the last command executed by the hardware decompression engine may be repeated. In some embodiments, this command may be used in conjunction with a standard decompression call or with a command indicating that a macro block should be copied from the video cache to the frame buffer. If CMD=17, this call may repeat the last bitmap generated "n" number of times, where "n" is provided in the input data structure 1000 in the Repeat Count for CMD portion 1014 of the input data structure 1000.

In some embodiments, as the same bitmap is repeated "n" number of times, it may become unnecessary to fill up the output buffer with the same bitmap, so instead, the flush control state machine creates the proper burst sequence by reading the same bitmap the specified number of times. Thus, the last call executed may be tracked such that the call may be repeated if specified in the next command processed by the decompression engine.

In some embodiments, if there is only one macro block in the output buffer, each row of the macro block may be repeated until the end of the repeat count in order to reduce the number of page misses that may be associated with writing entire macro blocks to the frame buffer and to thereby avoid the extra time penalty associated with page misses on external DRAM.

In some embodiments, if more than one macro block is in the output buffer, the output buffer may be flushed until the end of the repeat count, taking into account the first few macro blocks. For example, if the command sequence for macro blocks is $M_0 M_1 M_2 M_3$ each having eight rows $R_0$-$R_7$, where the repeat count is Rcnt=100, the flush sequence should be $M_0R_0 M_1R_0 M_2R_0 M_3R_0 M_3R_0 M_3R_0 M_3R_0$ ... Repeat, $M_0R_1 M_1R_1 M_2R_1 M_3R_1 M_3R_1 M_3R_1 M_3R_1$ ... Repeat, and the like.

In some embodiments, if the command sequence for macro blocks has commands that have shorter repeat counts (e.g., Rcnt=2) as well as longer repeat counts (e.g., Rcnt=100), the output buffer may be flushed until the end of the longer repeat count. For example, if the command sequence is $M_0$ (Rcnt=2) $M_1$ (Rcnt=100), the flush sequence should be $M_0R_0 M_0R_0 M_0R_0 M_1R_0 M_1R_0 M_1R_0 M_1R_0$ ... Repeat, $M_0R_1 M_0R_1 M_0R_1 M_1R_1 M_1R_1 M_1R_1 M_1R_1$ ... Repeat, and the like. Processing command sequences with repeat counts in this manner provides a more efficient data write to the frame buffer while avoiding page misses and any time penalty associated with those DRAM page misses.

If CMD=18, the decompression engine may execute the command by flushing the output buffer in response.

A profiler may be utilized by the hardware command queue, which may profile upcoming commands in the command queue waiting to be processed such that the decompression engine may more efficiently process the upcoming commands. For example, the profiler may find a lengthy repeat command in the queue and determine that a flush command should be performed after the lengthy repeat command is processed. The profiler may look ahead in the queues to look for contiguous macro blocks so that data may be collected in the output buffer in a manner that provides for more efficient memory transfer to the frame buffer. The profiler may also look ahead for particular types of commands waiting to be processed. Each type of command has a preordained weight depending on how long it takes to process that command. For repeat commands, that weight may be multiplied by the number of times the command is repeated. Adding up the weights for a queue may provide information associated with how busy the hardware decompression cores are going to be and may provide feedback to the hardware command queue to hold off getting more commands from the software command queue and instead offload commands for a user to the software-controlled decompression cores (e.g., the thin-client terminal system CPU).

For CMD=28 to 31, these commands may be associated with functions of the queue management engine of the decompression engine wrapper (e.g., wrapper components shown in FIG. 5). If CMD=28 to 31, the queue management engine may manage the command queues of the decompression engine wrapper based on the event specified by the command. For example, some commands may direct the queue management engine to wait when a specified event Occurs.

Figure 11:
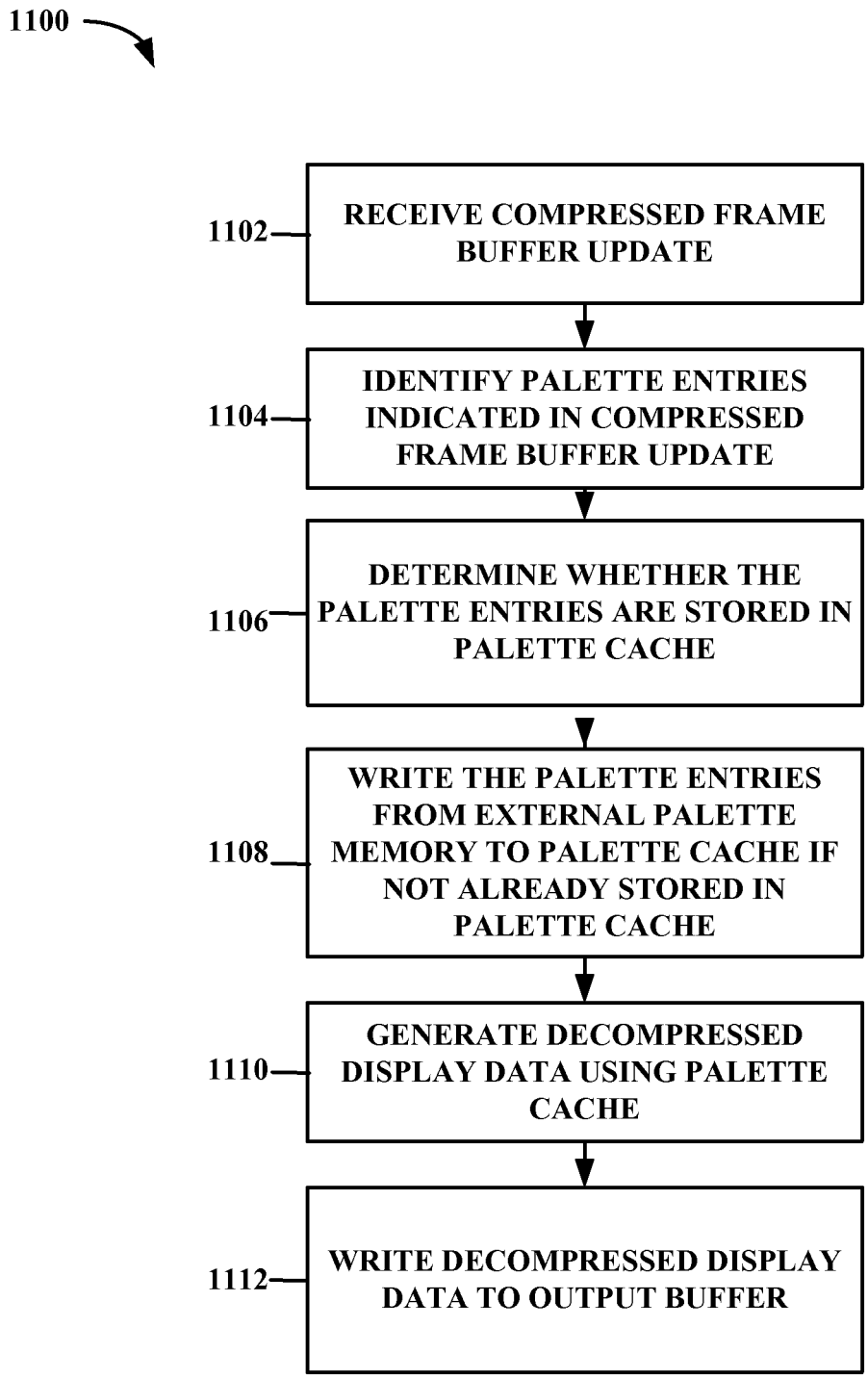
FIG. 11 illustrates a flowchart of an example method for utilizing a palette cache in a decompression engine, according to some embodiments.

FIG. 11 illustrates a flowchart of an example method 1100 for utilizing a palette cache in a decompression engine. In operation 1102, the decompression engine receives the compressed frame buffer update transmitted from a server (e.g., the thin-client server system) via a network. The compressed frame buffer update received may be in the form of the input data structure as shown in FIG. 10.

In operation 1104, the palette entries indicated in the compressed frame buffer update are identified by the decompression engine, where the palette entries are associated with the colors of the pixels.

In operation 1106, the decompression engine determines whether the identified palette entries are stored in the internal palette cache of the decompression engine.

In operation 1108, the decompression engine accesses the external palette memory and writes the palette entries for the appropriate colors from the external palette memory to the palette cache of the decompression engine if the palette cache does not already have the palette entries for the compressed frame buffer update being processed.

In operation 1110, the decompression engine generates the decompressed display data using the palette cache and the command specified by the compressed frame buffer update.

In operation 1112, the decompression engine writes the decompressed display data to the output buffer based on the rules and commands described above, providing efficient burst write transfers and reduced page misses.

The preceding technical disclosure is intended to be illustrative, and not restrictive. For example, the above-described embodiments (or one or more aspects thereof) may be used in combination with each other. Other embodiments will be apparent to those of skill in the art upon reviewing the above description. The scope of the claims should, therefore, be determined with reference to the appended claims, along with the full scope of equivalents to which such claims are entitled. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract is provided to comply with 37 C.F.R. §1.72 (b), which requires that it allow the reader to quickly ascertain the nature of the technical disclosure. The abstract is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment.

What is claimed is:

1. A digital video display system, comprising:
external palette memory configured to store a plurality of palette entries associated with a plurality of colors; and
a hardware decompression engine comprising an output buffer and a palette cache configured to store a subset of the plurality of palette entries from the external palette memory, the decompression engine being configured to receive a compressed frame buffer update transmitted from a server via a network, the decompression engine further configured to process the compressed frame buffer update by being configured to:
identify one or more palette entries indicated in the compressed frame buffer update;
determine whether the one or more palette entries is stored in the palette cache;
write the one or more palette entries from the external palette memory to the palette cache if the one or more palette entries is not stored in the palette cache;
generate decompressed display data based on the compressed frame buffer update, wherein the decompressed display data is generated using the palette cache; and
write the decompressed display data to the output buffer.

2. The digital video display system of claim 1, wherein the decompression engine is further configured to send the decompressed display data from the output buffer to a frame buffer in response to an occurrence of a predetermined condition.

3. The digital video display system of claim 2, wherein the compressed frame buffer update includes a repeat command indicating the decompressed display data is to be written to the output buffer a specified number of times and wherein the decompressed display data is sent from the output buffer to the frame buffer in response to the decompressed display data being written to the output buffer the specified number of times.

4. The digital video display system of claim 2, wherein the compressed frame buffer update includes a flush command indicating the output buffer is to be written to the frame buffer and wherein the decompressed display data is sent from the output buffer to the frame buffer in response to the output buffer receiving the decompressed display data.

5. The digital video display system of claim 2, wherein the occurrence of the predetermined condition includes the amount of data stored in the output buffer reaching a particular threshold.

6. The digital video display system of claim 2, wherein the occurrence of the predetermined condition includes a counter reaching a particular limit.

7. The digital video display system of claim 1, wherein the hardware decompression engine further comprises:
a command queue configured to store a plurality of compressed frame buffer updates and send each compressed frame buffer update of the plurality of compressed frame buffer updates to a decoder of the hardware decompression engine.

8. The digital video display system of claim 7, further comprising:
a queue management engine configured to:
identify a next command included in a subsequent compressed frame buffer update subsequent to the compressed frame buffer update in the command queue;
select a particular decoder from a plurality of decoders of the hardware decompression engine based on predetermined criteria; and
send the subsequent compressed frame buffer update to the particular decoder.

9. The digital video display system of claim 7, further comprising:
a queue management engine configured to:
identify a next command included in a subsequent compressed frame buffer update subsequent to the compressed frame buffer update in the command queue; and
based on the next command, enabling an indicator of the subsequent compressed frame buffer update indicating the decompressed display data is to be sent from the output buffer to a frame buffer after the next command is processed.

10. The digital video display system of claim 1, wherein the subset of the plurality of palette entries includes recently accessed palette entries.

11. The digital video display system of claim 1, wherein the compressed frame buffer update includes a copy command indicating data from a video cache is to be written to the output buffer and wherein the data from the video cache is sent to the output buffer in response to the hardware decompression engine executing the copy command.

12. The digital video display system of claim 1, wherein the compressed frame buffer update includes a decompress and video cache update command indicating a video cache portion of the compressed frame buffer update is to be updated and wherein the video cache portion of the compressed frame buffer update is updated in response to the hardware decompression engine executing the decompress and video cache update command.

13. The digital video display system of claim 1, wherein the external palette memory receives one or more palette entries from the server if the server determines the one or more palette entries are absent from the plurality of palette entries.

14. The digital video display system of claim 1, wherein the hardware decompression engine is further configured to:
collect, at the output buffer, decompressed data associated with one or more compressed frame buffer updates, the decompressed data being collected in the output buffer in a contiguous manner;
determine whether an amount of decompressed data collected in the output buffer has reached an optimal burst size; and
send the decompressed data from the output buffer to a frame buffer when the amount of decompressed data collected in the output buffer has reached the optimal burst size.

15. The digital video display system of claim 1, wherein the compressed frame buffer update includes a command indicating a number of bits used to represent a palette entry associated with the compressed frame buffer update and wherein the decompressed display data is generated based on the command.

16. A method comprising:
receiving, by a hardware decompression engine, a compressed frame buffer update transmitted from a server via a network;
identifying one or more palette entries indicated in the compressed frame buffer update;
determining whether the one or more palette entries is stored in a palette cache of the decompression engine;
writing the one or more palette entries from an external palette memory to the palette cache if the one or more palette entries is not stored in the palette cache, the external palette memory being external to the decompression engine and storing a plurality of palette entries including the one or more palette entries;
generating decompressed display data based on the compressed frame buffer update including generating the decompressed display data using the palette cache; and
writing the decompressed display data to an output buffer of the hardware decompression engine.

17. The method of claim 16, further comprising:
sending the decompressed display data from the output buffer to a frame buffer in response to an occurrence of a predetermined condition.

18. The method of claim 17, wherein the compressed frame buffer update includes a repeat command indicating the decompressed display data is to be written to the output buffer a specified number of times and wherein the decompressed display data is sent from the output buffer to the frame buffer in response to the decompressed display data being written to the output buffer the specified number of times.

19. The method of claim 17, wherein the compressed frame buffer update includes a flush command indicating the output buffer is to be written to the frame buffer and wherein the decompressed display data is sent from the output buffer to the frame buffer in response to the output buffer receiving the decompressed display data.

20. The method of claim 17, wherein the occurrence of the predetermined condition includes the amount of data stored in the output buffer reaching a particular threshold.

21. The method of claim 17, wherein the occurrence of the predetermined condition includes a counter reaching a particular limit.

22. The method of claim 16, further comprising:
storing a plurality of compressed frame buffer updates in a command queue of the hardware decompression engine; and
sending each compressed frame buffer update of the plurality of compressed frame buffer updates to a decoder of the hardware decompression engine.

23. The method of claim 22, further comprising:
identifying a next command included in a subsequent compressed frame buffer update subsequent to the compressed frame buffer update in the command queue;

selecting a particular decoder from a plurality of decoders of the hardware decompression engine based on predetermined criteria; and
sending the subsequent compressed frame buffer update to the particular decoder.

24. The method of claim 22, further comprising:
identifying a next command included in a subsequent compressed frame buffer update subsequent to the compressed frame buffer update in the command queue; and
based on the next command, enabling an indicator of the subsequent compressed frame buffer update indicating the decompressed display data is to be sent from the output buffer to a frame buffer after the next command is processed.

25. The method of claim 16, wherein the palette cache includes recently accessed palette entries.

26. The method of claim 16, wherein the compressed frame buffer update includes a copy command indicating data from a video cache is to be written to the output buffer and wherein the data from the video cache is sent to the output buffer in response to the hardware decompression engine executing the copy command.

27. The method of claim 16, wherein the compressed frame buffer update includes a decompress and video cache update command indicating a video cache portion of the compressed frame buffer update is to be updated and wherein the video cache portion of the compressed frame buffer update is updated in response to the hardware decompression engine executing the decompress and video cache update command.

28. The method of claim 16, wherein the external palette memory receives at least one palette entry from the server if the server determines the at least one palette entry is absent from the plurality of palette entries.

29. The method of claim 16, further comprising:
collecting, at the output buffer, decompressed data associated with one or more compressed frame buffer updates, the decompressed data being collected in the output buffer in a contiguous manner;
determining whether an amount of decompressed data collected in the output buffer has reached an optimal burst size; and
sending the decompressed data from the output buffer to a frame buffer when the amount of decompressed data collected in the output buffer has reached the optimal burst size.

30. The method of claim 16, wherein the compressed frame buffer update includes a command indicating a number of bits used to represent a palette entry associated with the compressed frame buffer update and wherein the decompressed display data is generated based on the command.

31. A device, comprising:
a command buffer configured to receive a compressed frame buffer update transmitted from a server via a network;
a palette cache configured to store a subset of a plurality of palette entries, the plurality of palette entries being stored in an external palette memory external to the device;
an output buffer configured to store a set of decompressed display data; and
a decoder configured to:
identify one or more palette entries indicated in the compressed frame buffer update;
determine whether the one or more palette entries is stored in the palette cache;
write the one or more palette entries from the external palette memory to the palette cache if the one or more palette entries is not stored in the palette cache;
generate decompressed display data based on the compressed frame buffer update, wherein the decompressed display data is generated using the palette cache; and
write the decompressed display data to the output buffer.

32. The device of claim 31, wherein the output buffer is further configured to send the decompressed display data from the output buffer to a frame buffer in response to an occurrence of a predetermined condition.

33. The device of claim 32, wherein the compressed frame buffer update includes a repeat command indicating the decompressed display data is to be written to the output buffer a specified number of times and wherein the set of decompressed display data is sent from the output buffer to the frame buffer in response to the decompressed display data being written to the output buffer the specified number of times.

34. The device of claim 32, wherein the compressed frame buffer update includes a flush command indicating the set of decompressed display data of the output buffer is to be written to the frame buffer and wherein the set of decompressed display data is sent from the output buffer to the frame buffer in response to the output buffer receiving the decompressed display data.

35. The device of claim 32, wherein the occurrence of the predetermined condition includes the amount of the set of decompressed display data stored in the output buffer reaching a particular threshold.

36. The device of claim 32, wherein the occurrence of the predetermined condition includes a counter reaching a particular limit.

37. The device of claim 31, wherein the command buffer is further configured to store a plurality of compressed frame buffer updates and send each compressed frame buffer update of the plurality of compressed frame buffer updates to the decoder.

38. The device of claim 37, further comprising:
a queue management engine configured to:
identify a next command included in a subsequent compressed frame buffer update subsequent to the compressed frame buffer update in the command buffer;
select a particular decoder from a plurality of decoders of the device based on predetermined criteria; and
send the subsequent compressed frame buffer update to the particular decoder.

39. The device of claim 37, further comprising:
a queue management engine configured to:
identify a next command included in a subsequent compressed frame buffer update subsequent to the compressed frame buffer update in the command buffer; and
based on the next command, enabling an indicator of the subsequent compressed frame buffer update indicating the decompressed display data is to be sent from the output buffer to a frame buffer after the next command is processed.

40. The device of claim 31, wherein the subset of the plurality of palette entries includes recently accessed palette entries.

41. The device of claim 31, wherein the compressed frame buffer update includes a copy command indicating data from a video cache is to be written to the output buffer and wherein the data from the video cache is sent to the output buffer in response to the device executing the copy command.

42. The device of claim 31, wherein the compressed frame buffer update includes a decompress and video cache update command indicating a video cache portion of the compressed frame buffer update is to be updated and wherein the video cache portion of the compressed frame buffer update is updated in response to the device executing the decompress and video cache update command.

43. The device of claim 31, wherein the external palette memory receives one or more palette entries from the server if the server determines the one or more palette entries are absent from the plurality of palette entries.

44. The device of claim 31, wherein the output buffer is further configured to:
  collect decompressed data associated with one or more compressed frame buffer updates, the decompressed data being collected in the output buffer in a contiguous manner;
  determine whether an amount of decompressed data collected in the output buffer has reached an optimal burst size; and
  send the decompressed data from the output buffer to a frame buffer when the amount of decompressed data collected in the output buffer has reached the optimal burst size.

45. The device of claim 31, wherein the compressed frame buffer update includes a command indicating a number of bits used to represent a palette entry associated with the compressed frame buffer update and wherein the decompressed display data is generated based on the command.

46. A device, comprising:
  means for receiving a compressed frame buffer update transmitted from a server via a network;
  first means for storing a subset of a plurality of palette entries, the plurality of palette entries being stored in an external palette memory external to the device;
  second means for storing a set of decompressed display data; and
  means for decoding the compressed frame buffer update, the means for decoding configured to:
    identify one or more palette entries indicated in the compressed frame buffer update;
    determine whether the one or more palette entries is stored in the first means for storing;
    write the one or more palette entries from the external palette memory to the first means for storing if the one or more palette entries is not stored in the first means for storing;
    generate decompressed display data based on the compressed frame buffer update, wherein the decompressed display data is generated using the first means for storing; and
    write the decompressed display data to the second means for storing.

* * * * *